(12) United States Patent
Yamaguchi et al.

(10) Patent No.: US 8,024,987 B2
(45) Date of Patent: Sep. 27, 2011

(54) LINEAR ACTUATOR

(75) Inventors: Zentaro Yamaguchi, Takasaki (JP); Masato Nakamura, Isesaki (JP)

(73) Assignee: Mitsuba Corporation, Kiryu-shi (JP)

( * ) Notice: Subject to any disclaimer, the term of this patent is extended or adjusted under 35 U.S.C. 154(b) by 825 days.

(21) Appl. No.: 11/992,601

(22) PCT Filed: Sep. 26, 2006

(86) PCT No.: PCT/JP2006/319012
§ 371 (c)(1),
(2), (4) Date: Mar. 26, 2008

(87) PCT Pub. No.: WO2007/037214
PCT Pub. Date: Apr. 5, 2007

(65) Prior Publication Data
US 2010/0139427 A1    Jun. 10, 2010

(30) Foreign Application Priority Data

Sep. 28, 2005 (JP) ................... 2005-283117
Sep. 28, 2005 (JP) ................... 2005-283130
Sep. 28, 2005 (JP) ................... 2005-283138
Oct. 21, 2005 (JP) ................... 2005-306621
Jul. 12, 2006 (JP) ................... 2006-191337

(51) Int. Cl.
*F16H 3/06* (2006.01)
(52) U.S. Cl. .................... 74/89.23; 74/89.38
(58) Field of Classification Search .......... 74/89.23, 74/89.38, 425, 458, 424.71, 410; 324/207.24, 324/207, 25, 207.26; *F16H 3/06, 27/02, F16H 29/02, 29/20*
See application file for complete search history.

(56) References Cited

U.S. PATENT DOCUMENTS

| 4,754,660 | A | * | 7/1988 | Kobayashi et al. | ............. | 74/427 |
| 5,329,657 | A | * | 7/1994 | Bartley et al. | ............. | 5/617 |
| 7,047,834 | B2 | * | 5/2006 | Nielsen et al. | ............. | 74/89.38 |
| 2004/0093969 | A1 | * | 5/2004 | Nielsen | ............. | 74/89.23 |

FOREIGN PATENT DOCUMENTS
JP    51-58241    5/1976
(Continued)

*Primary Examiner* — Thomas R Hannon
*Assistant Examiner* — Phillip A Johnson
(74) *Attorney, Agent, or Firm* — Kratz, Quintos & Hanson, LLP

(57) ABSTRACT

A linear actuator capable of making a bed flat in emergencies is provided.
A sub-shaft 52 linking to the worm reduction gear, an inner race 59 coupled by a spline on the sub-shaft 52, an engaging pin 83 and an engaging notch 92 provided between the shaft 16 and the inner race 59 to allow free linking, an operating ring 66 fitting for free rotation on the outer circumference of a housing 11, and a function ring 72 for converting the rotation of the operating ring 66 to an axial movement and transmitting it to the inner race 59 are installed on a linear actuator 10 containing a shaft 16 with a male screw 17, a worm reduction gear for transmitting the rotation of a motor 40 to the shaft 16, a nut 19 that is coupled by a screw to the male screw 17 and advances or retreats by the forward rotation of the shaft 16 and advances or retreats by the reverse rotation of the shaft 16, and a moving cylinder 12 that is fixed to the nut 19 and advances and retreats relative to the housing 11. In emergencies, the shaft 16 can rotate freely by releasing the link between the engaging notch and the engaging pin.

12 Claims, 17 Drawing Sheets

FOREIGN PATENT DOCUMENTS

| | | |
|---|---|---|
| JP | 62-25224 | 2/1987 |
| JP | 3-170214 | 7/1991 |
| JP | 8-193648 | 7/1996 |
| JP | 2000-253618 | 9/2000 |
| JP | 2001-124171 | 5/2001 |
| JP | 2003-52762 | 2/2003 |
| JP | 2005-164026 | 6/2005 |
| JP | 2005-188571 | 7/2005 |
| JP | 2005188571 A * | 7/2005 |

* cited by examiner

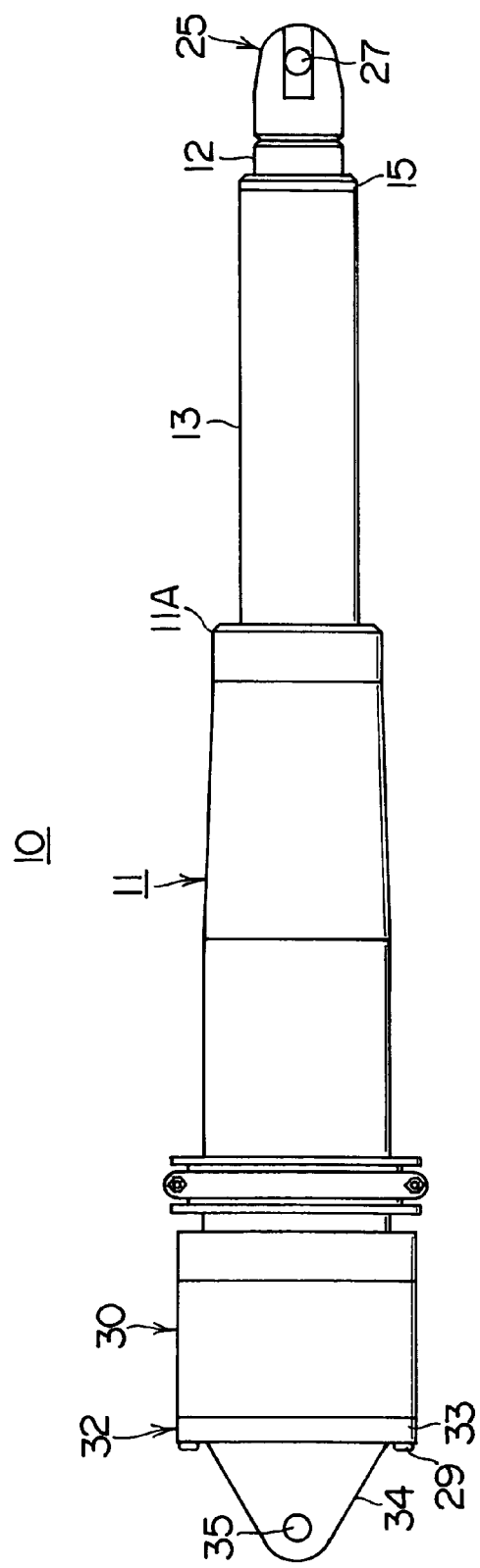

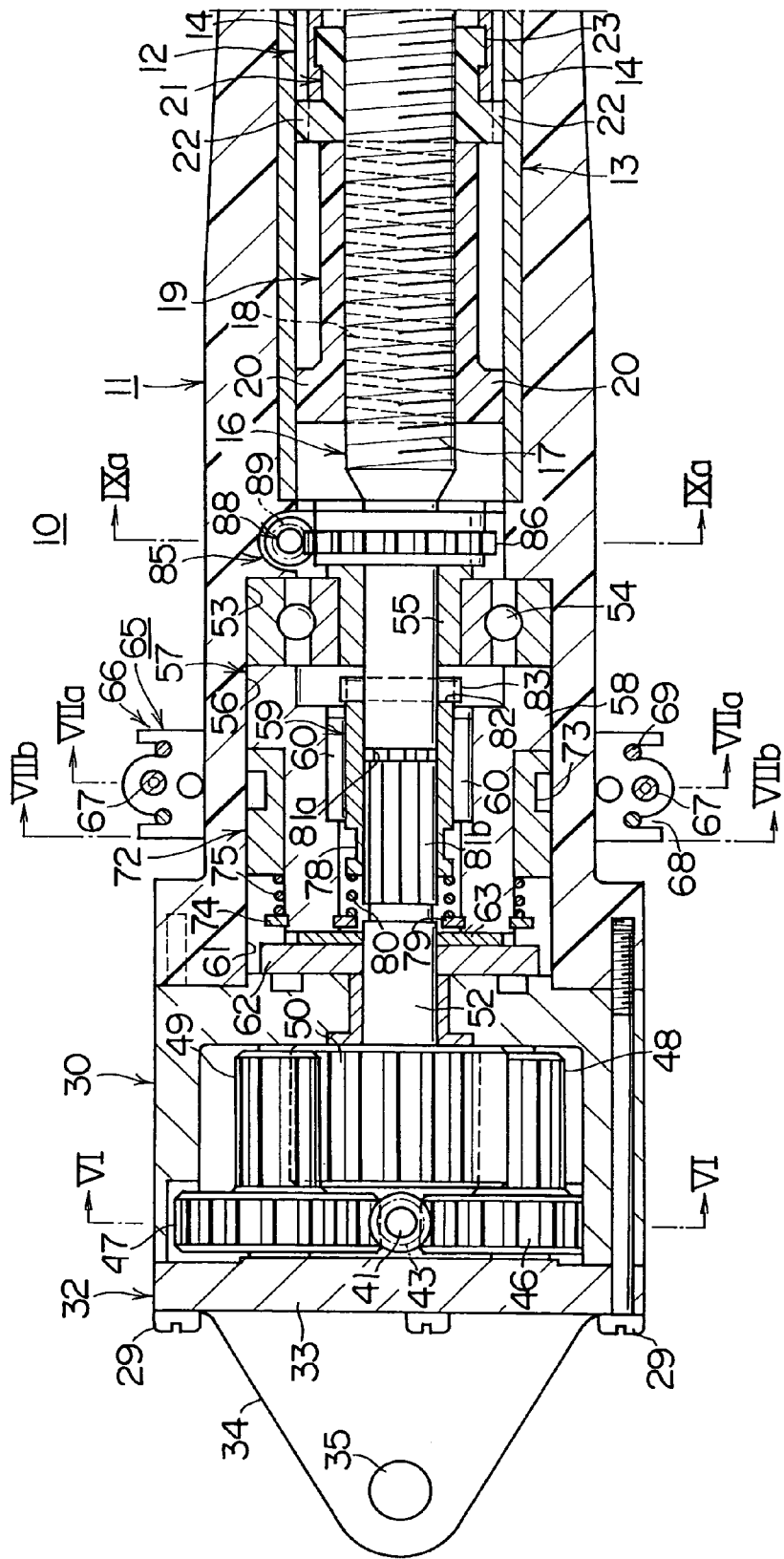

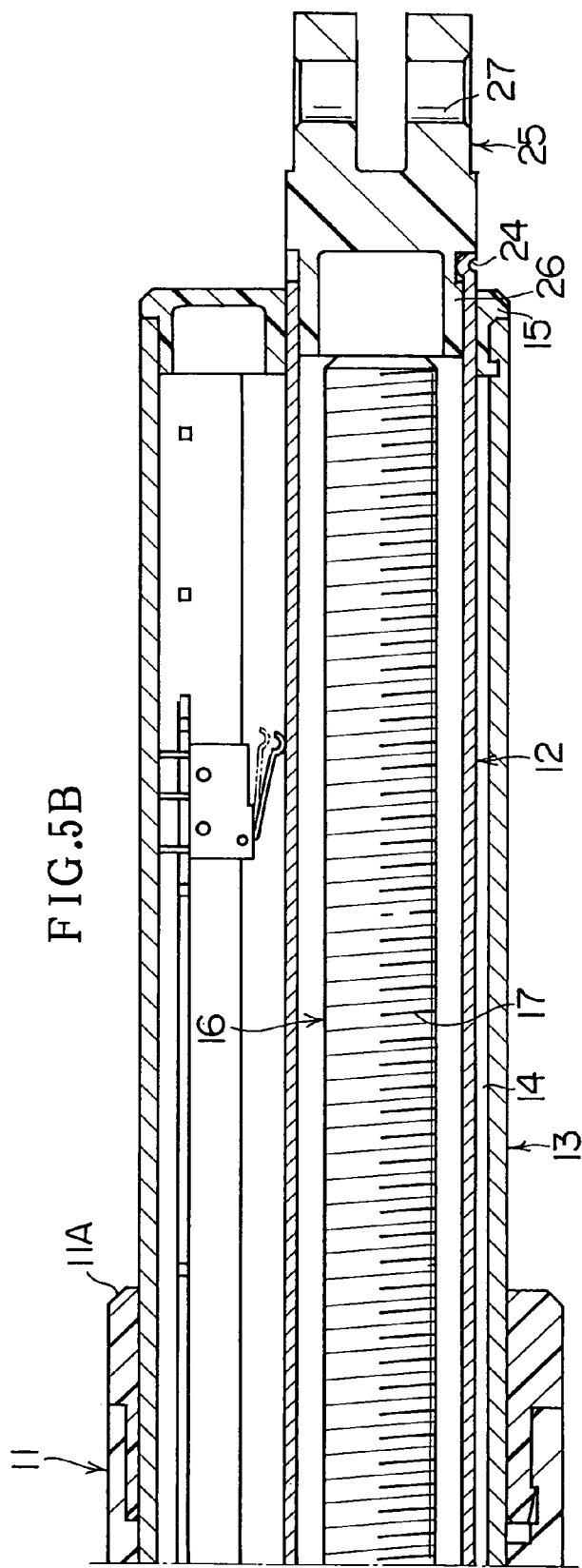

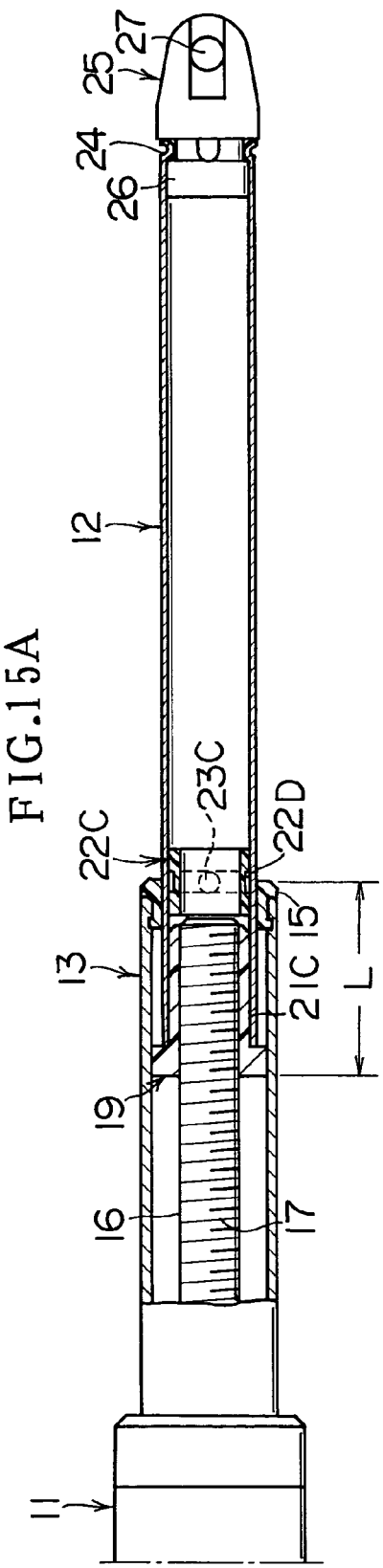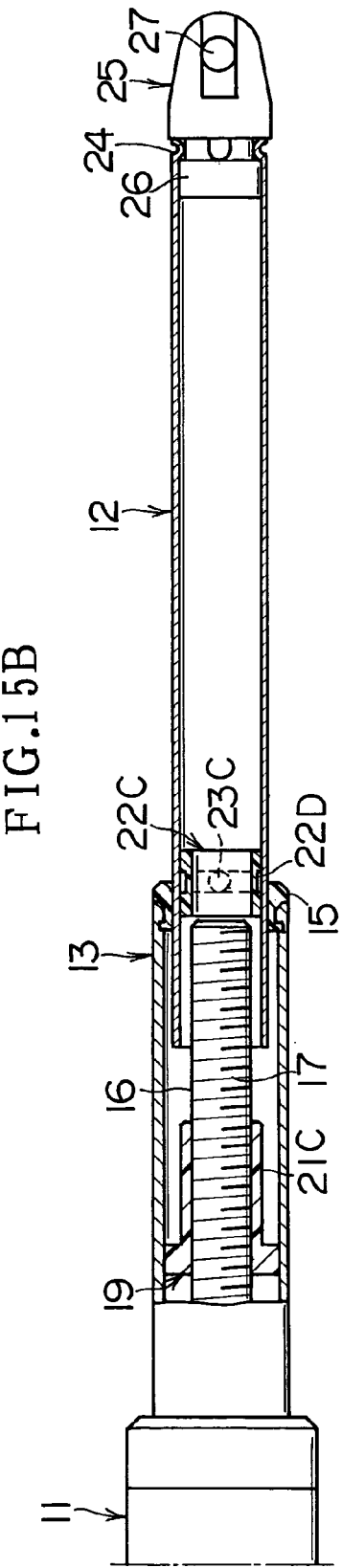

LINEAR ACTUATOR

TECHNICAL FIELD

The present invention relates to a linear actuator and relates in particular to electrical feed-screw type linear actuators, for example, effective for use in raising and lowering beds or tilting the back section or knee section of beds for nursing or medical treatment.

BACKGROUND ART

Electrical feed-screw type linear actuators for sick beds/nursing beds, raise and lower the bed or tilt the back section or knee section of the bed in order to lower the burden on patients of living daily.

Technology for linear actuators of this type in the background art is disclosed in the patent document 1.

Namely, this linear actuator contains a shaft with a male screw, a worm reduction gear for reducing and transmitting the rotation of the motor to the shaft, a female screw member (feed nut) that is coupled by a screw to the male screw of the shaft and advances and retreats by the rotation of the shaft, a moving cylinder that is fixed to the female screw member and advances and retreats relative to a housing, and a potentiosensor for detecting the position of the moving cylinder. This linear actuator is structured so that the moving cylinder is connected by way of a coupling piece to a link to move the bed up and down or to tilt the back section or knee section of the bed while the potentiosensor detects the position of the moving cylinder.

In some cases, the sick bed/nursing bed is equipped with equipment called a CPR mechanism.

The CPR mechanism is a device for making the bed return to a flat state in emergencies such as requiring cardio-pulmonary resuscitation.

This CPR mechanism must operate quickly and reliably whatever the circumstances, and must not restrict the operations of the linear actuator in a normal use of bed.

The technology in the patent document 2 discloses a sick bed/nursing bed containing this type of CPR mechanism.

In this type of sick bed/nursing bed, a cable joins an operating lever installed on the rear side of the back recliner plate to a release lever for canceling the operation of the anti-reverse mechanism in the linear actuator. This mechanism allows easily rotating the release lever in the release direction by gripping the operating lever to temporarily raise the back recliner plate in order to release the load acting on the anti-reverse mechanism.

The linear actuator containing CPR mechanism also includes mechanisms where pushing an operating lever shifts the operating rod of a one-way clutch to automatically disengage the one-way clutch (see the patent document 3).

Patent document 1: Japanese Patent Non-Examined Publication No. 2005-188571
Patent document 2: Japanese Patent Non-Examined Publication No. 2003-52762
Patent document 3: Japanese Patent Non-Examined Publication No. 2000-253618

DISCLOSURE OF INVENTION

Problem to be Solved by the Invention

However, the sick bed/nursing bed and linear actuator containing the above CPR mechanism possess the problem that bed unexpectedly goes to horizontal position since the one-way clutch or anti-reverser mechanism is easily released when an external force is mistakenly applied to the wire or operating lever.

A first object of the present invention is to provide a linear actuator that can prevent the bed from unexpectedly moving to the horizontal position.

Another object is to provide a linear actuator capable of transmitting the operating force from a minimum distance by wires or rods from the side of the bed during CPR mechanism operation.

In the above linear actuators used in the sick bed/nursing beds, a moving cylinder with a long stroke requires a large installation space for the potentiosensor causing the problem that the designing the linear actuator is difficult.

More specifically, the rotation speed and the stroke length (linear distance) that are detectable by the potentiosensor are limited, so when the maximum stroke (maximum movement distance) of the moving cylinder is long, it is necessary to reduce the maximum stroke length of the moving cylinder to a stroke distance detectable by the potentiosensor.

This requirement signifies that a large speed reducing ratio must be set when transmitting the number of shaft rotations (rotation speed) for moving the moving cylinder to the sensor shaft of the potentiosensor.

A large speed reducing ratio, however, requires increasing the engagement steps on the spur gear (intermediate gear) or making the gear outer diameter larger so that a larger gear installation space is needed.

The CPR mechanism is structured as a clutch for linking the shaft and the motor rotation shaft during normal operation and for disengaging the shaft and the motor rotation shaft in emergencies.

In linear actuators containing this type of CPR mechanism, the detector tip on the potentiosensor must be linked to the shaft. Unless the output end of the potentiosensor is linked to the shaft, the relative positions of the moving cylinder and the potentiosensor will deviate when the CPR mechanism is operated so that an error will occur in the value measured on the potentiosensor.

A second object of the present invention is to provide a linear actuator that can be made in a smaller size and that also link the potentiosensor to the shaft.

In the above linear actuators used in the sick bed/nursing beds, the worm shaft of the worm reduction gear is at a position offset versus the worm wheel, causing the problem that the stator in the motor jumps outward relative to the shaft center of the linear actuator.

Consequently when this linear actuator is installed onto the bed, the dimensions create an obstruction or the installation direction is limited, causing the problem of restrictions on the bed design.

A third object of the present invention is to provide a linear actuator that can be made in a smaller size and install a worm shaft and worm wheels symmetrically.

Moreover, in the above linear actuators used in the sick bed/nursing beds, the moving cylinder is clamped to a female screw member, so that if for example someone's hand or objects becomes pinched while the bed is lowering, then the returning thrust force of the linear actuator will be applied to that pinched hand or object.

Whereupon, to prevent the returning thrust force of the linear actuator from being applied to someone's hand or objects that became pinched while the bed is lowering, a so-called free wheel mechanism was employed for making the female screw member automatically separate from the moving cylinder.

However, in structures that merely separate the moving cylinder and female screw member, the length of the moving cylinder is long, so that the overall length of the linear actuator also becomes long. Moreover, when the linear actuator reaches its full stroke, sufficient lap clearance cannot be obtained between the housing and the moving cylinder, creating the problem that there is inadequate strength to withstand bend momentum that occurs due to the pressing load and center deviation between the linear actuator and the bed.

A fourth object of the present invention is to provide a linear actuator that can avoid making the moving cylinder longer, maintain a sufficient lap clearance between the housing and the moving cylinder, and prevent the returning thrust force of the linear actuator from being applied to pinched objects.

Means for Solving the Problem

Typical aspects for resolving the aforementioned problems are as follows.

(1) A linear actuator comprising a housing supporting a shaft with a male screw to allow free rotation, a female screw member that is coupled by a screw to the male screw and advances or retreats by the forward rotation of the shaft and advances or retreats by the reverse rotation of the shaft, a moving cylinder that is fixed to the female screw member and advances and retreats relative to the housing, an input shaft for transmitting the rotation of a motor to the shaft, a clutch for engaging and disengaging the input shaft and the shaft, an operating ring fitted to allow free rotation on an outer circumference of the housing, and a function ring to convert the rotation of the operating ring to an axial movement and transmit it to the clutch.

(2) A linear actuator comprising a shaft rotated by a drive force of a motor, a moving piece that moves linearly through the rotation of the shaft, and a potentiosensor to detect a position of the moving piece, wherein the linear actuator includes a worm wheel fixed to the shaft, and a worm shaft with a worm engaging with the worm wheel, and the worm shaft is connected to a sensor shaft of the potentiosensor.

(3) A linear actuator comprising a shaft with a male screw, a worm reduction gear for reducing and transmitting the rotation of a motor to the shaft, a female screw member that is coupled by a screw to the male screw and advances or retreats by the forward rotation of the shaft and advances or retreats by the reverse rotation of the shaft, and a moving cylinder that is fixed to the female screw member and advances and retreats relative to a housing, wherein a pair of worm wheels engage with a worm shaft of the worm reduction gear, and the rotation of both the worm wheels is transmitted to the shaft.

(4) A linear actuator comprising a housing supporting a shaft with a male screw to allow free rotation, a female screw member that is coupled by a screw to the male screw and advances or retreats by the forward rotation of the shaft and advances or retreats by the reverse rotation of the shaft, a moving cylinder that is linked to the female screw member and advances and retreats relative to the housing, wherein a lap section is formed on the female screw member, one end of the moving cylinder is inserted into the lap section to advance and retreat freely.

Effect of Invention

The first (1) aspect of the invention renders the effect that the bed can be prevented from unexpectedly becoming horizontal because the clutch is not easily disengaged even if an external force is applied to the operating lever or wire by mistake, because a structure is utilized where the clutch disengages the shaft and the input shaft, after the function ring changes the rotation of the operating ring to a linear motion.

Moreover, the reliability can be improved and the cost can be reduced since an external force through the wire or rod, etc. from the operating lever can disengage the clutch without complicated routing structure.

The second (2) aspect of the invention renders the effect that a large speed reducing ratio can be set when transmitting the shaft rotation speed to the sensor shaft of the potentiosensor, without having to increase the outer diameter of the gear, or increase the number of engaging steps of the spur gear, in order for the worm reduction gear to connect the sensor shaft of the potentiosensor to the shaft. Therefore, the potentiosensor can be set in a small installation space even in cases where the moving cylinder has a long stroke, and the linear actuator can consequently be made compact.

Moreover, a deviation between the relative positions of the moving piece and the sensor shaft of the potentiosensor can be avoided even if for example, the link between the shaft and the rotation shaft of the motor is released in emergencies, since the worm reduction gear connects the sensor shaft of the potentiosensor to the shaft. Consequently, a CPR mechanism can be incorporated into the linear actuator utilized in sick bed/nursing beds.

The third (3) aspect of the invention renders the effect that the worm shaft and worm wheels can be positioned symmetrically since a structure is used where a pair of worm wheel engage with the worm shaft, and the rotation of both worm wheels is transmitted to the shaft.

The fourth (4) aspect of the invention renders the effect that the return thrust force from the linear actuator can be prevented from being applied to a pinched object, because a lap section of the female screw member capable of advancing and retreating, is inserted into one end of the moving cylinder, and this female screw member automatically separates from the moving cylinder when for example a person's hand or an object has become pinched while the bed is lowering.

Moreover, sufficient strength can be maintained to withstand bend momentum, and a longer moving cylinder can be avoided since a sufficient lap clearance can be assured between the female screw member and the moving cylinder by inserting a lap section of the female screw member capable of advancing and retreating into one end of the moving cylinder.

BRIEF DESCRIPTION OF DRAWINGS

FIG. 1A shows the state where placed flat; FIG. 1B shows the state where placed erect;

FIG. 2 is a frontal view showing the linear actuator of an embodiment of this invention;

FIG. 4A is a frontal cross sectional view showing the base end section;

FIG. 5B is a plan cross sectional view showing the tip section;

FIG. 10A is a side cross sectional view equivalent to FIG. 7B; FIG. 10B is a frontal cross sectional view equivalent to FIG. 4A;

FIG. 13A shows the disengaging operation of the engaging pin and the engaging notch; FIG. 13B shows the engaging operation of the engaging pin and engaging notch;

FIG. 14A is a side cross sectional view equivalent to FIG. 9A; FIG. 14B is a cross sectional view taken along the line b-b of FIG. 10A;

FIGS. 15A and 15B are drawings showing the operation of the free wheel mechanism in the linear actuator as the fourth embodiment of the present invention; FIG. 15A is a frontal partially cross sectional view with a portion omitted showing the state during full stroke; FIG. 15B is a frontal partially cross sectional view with a portion omitted showing the separation of the nut from the moving cylinder.

BEST MODE FOR CARRYING OUT THE INVENTION

Figure 1A:
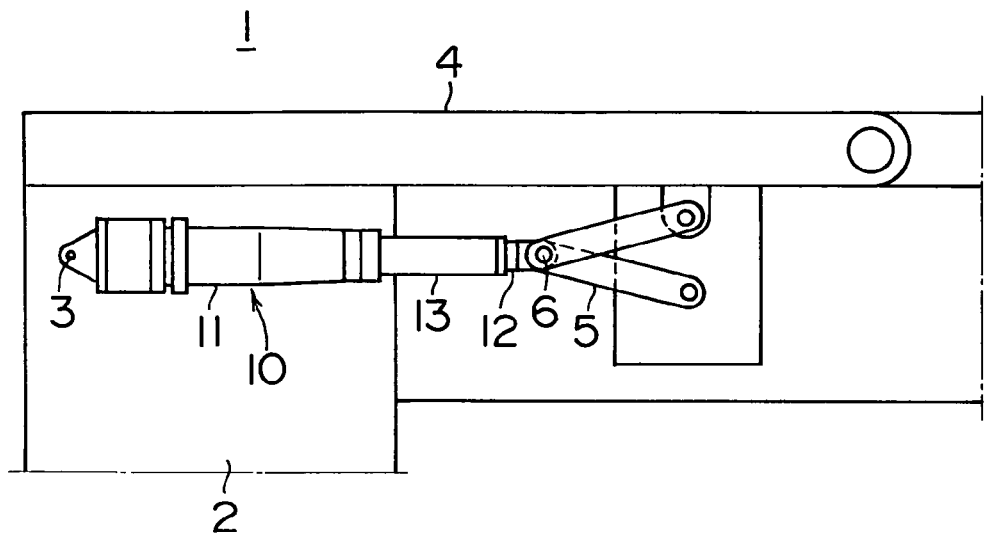
FIGS. 1A and 1B are frontal views showing an essential section of the sick bed/nursing bed using the linear actuator of an embodiment of this invention.

An embodiment of the present invention is described next while referring to the drawings.

Figure 1B:
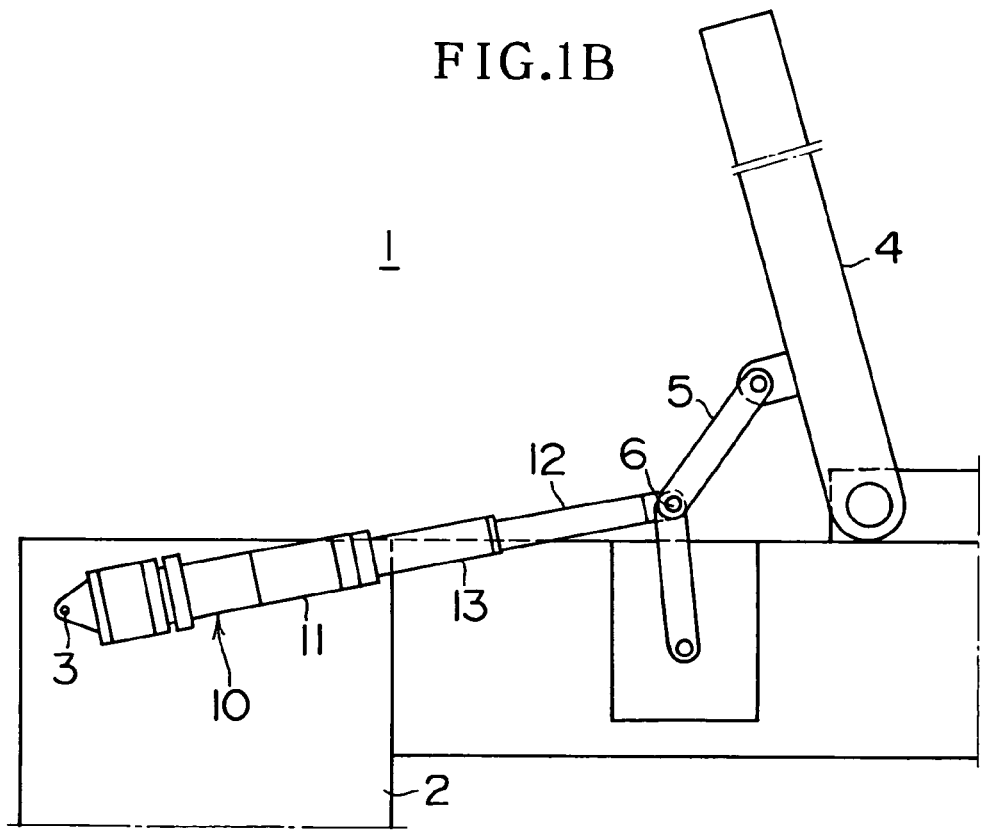

As shown in FIGS. 1A and 1B, the linear actuator of this embodiment is structured to raise and lower the back section of the sick bed/nursing bed (hereafter called, bed).

Figure 3:
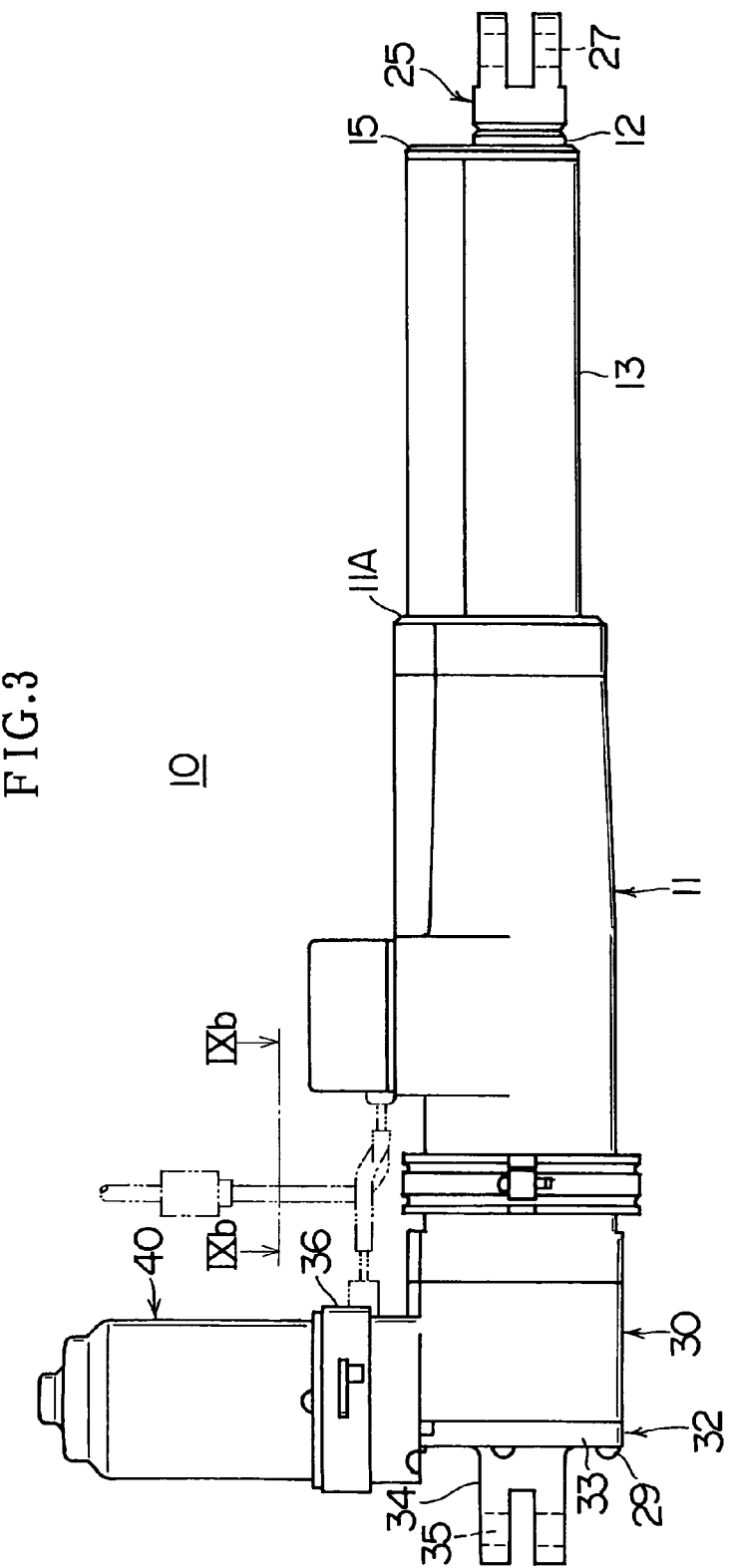
FIG. 3 is a plan view.

Namely, as shown in FIG. 2 and FIG. 3, a linear actuator 10 contains a housing 11, and a moving cylinder 12 that advances and retreats relative to the housing 11. The housing 11 on the fixed edge side of the linear actuator 10 as shown in FIGS. 1A and 1B, is connected to rotate freely by way of a pivot 3 on a frame 2 of a bed 1. The tip of the moving cylinder 12 on the free end side of the linear actuator 10 is connected to allow free rotation by way of a pivot 6 on a link 5 to raise and lower a back section of the bed (hereafter called the bed-back) 4.

In a state where the moving cylinder 12 of the linear actuator 10 has contracted, the bed-back 4 is placed horizontally as shown in FIG. 1A, and the bed-back 4 is raised as shown in FIG. 1B, when the moving cylinder 12 of the linear actuator 10 extends.

The housing 11 of the linear actuator 10 as shown in FIG. 2 through FIG. 5B is made of plastic and formed in an approximately cylindrical shape. One end of a support cylinder 13 is fitted into and supported on one end (hereafter called the tip) of the housing 11 as shown in FIGS. 4A, 4B and FIGS. 5A, 5B. The support cylinder 13 is formed in a round pipe shape and has an outer diameter equivalent to the inner diameter of the housing 11. A plug 11A is fitted into a tip opening of the housing 11.

A pair of anti-rotation means 14 for stopping the rotation of female screw member are formed respectively across the approximate total length on the inner circumferential surface of the support cylinder 13. Both of the anti-rotation means 14, 14 are formed respectively in a narrow key shape with a specified height and width along the axis.

Figure 4B:
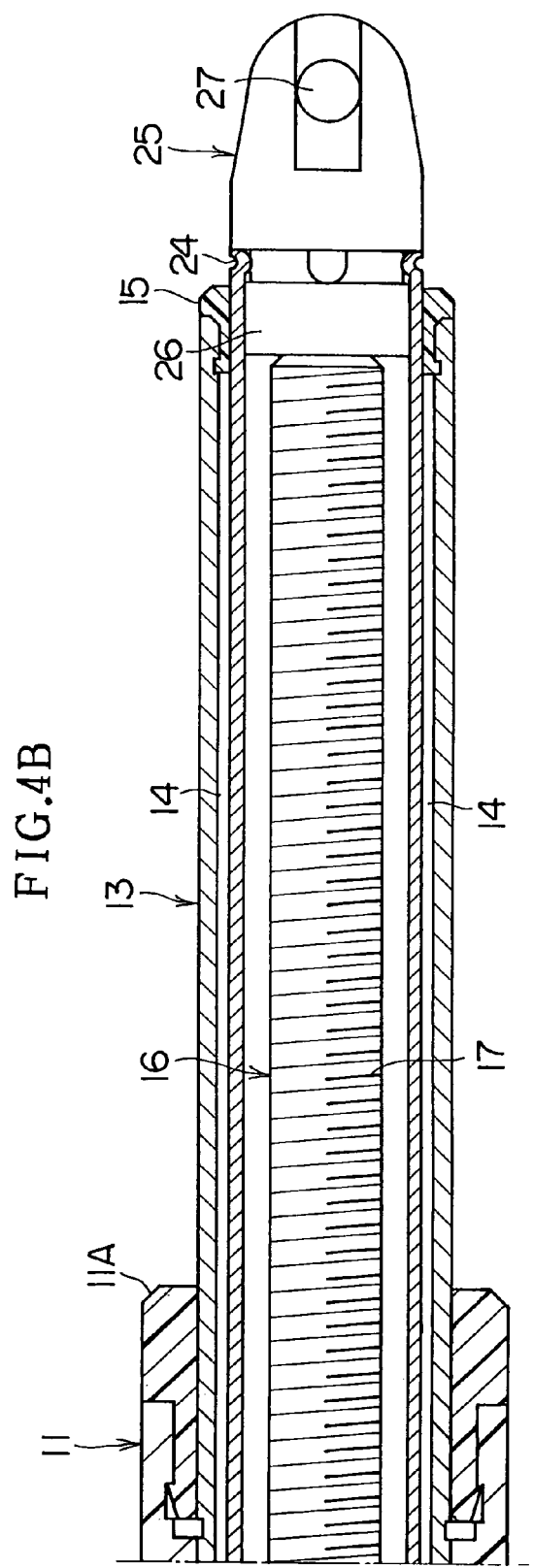
FIG. 4B is a frontal cross sectional view showing the tip section.

A plug 15 formed in a cylindrical shape including a brim on the outer circumference, is fitted into the tip opening of the support cylinder 13 as shown in FIG. 4B and FIG. 5B.

A shaft 16 is installed in the cylindrical center of the support cylinder 13. A male feed screw 17 is formed on the outer circumference of an area corresponding to the support cylinder 13 on the shaft 16. A nut 19 serving as a female screw member with a female screw 18 coupled on the mail screw 17 is connected to advance and retreat on the male screw 17.

A pair of anti-rotation means 20 are formed respectively in a key groove shape on the outer circumferential section of the base end of the nut 19. Both of the anti-rotation means 20, 20 are respectively fitted to slide axially on the pair of anti-rotation means 14, 14 on the inner circumferential surface of the support cylinder 13. The nut 19 can therefore slide axially in a state where the rotation is stopped by the anti-rotation means 14, 20 in the support cylinder 13.

A slider 21 is fitted to allow sliding movement at the flank on the tip side of the nut 19 on the outer circumference of the shaft 16. The base surface of the slider 21 is abutted against the tip surface of the nut 19. In other words, the slider 21 is basically slaved to the forward and reverse movement of the nut 19.

A pair of anti-rotation means 22 are formed respectively in a key groove shape on the outer circumference of the base end of the slider 21. Both of the anti-rotation means 22, 22 are respectively fitted to slide axially on the pair of anti-rotation means 14, 14 on the inner circumferential surface of the support cylinder 13. The slider 21 can therefore slide axially in a state where the rotation is stopped by the anti-rotation means 14, 22 in the support cylinder 13.

The base end of the moving cylinder 12 is fitted on the outer circumference of the tip of the slider 21. A clamp 23 clamps the moving cylinder 12 on the slider 21. The moving cylinder 12 is formed in a round pipe shape longer than the support cylinder 13.

The tip of the moving cylinder 12 protrudes forwards from the plug 15 fitted on the support cylinder 13. The intermediate section of the moving cylinder 12 is supported by the plug 15 in a state to allow free sliding.

As shown in FIG. 4B and FIG. 5B, a base end section 26 of a coupling piece 25 for connecting the moving cylinder 12 to the link 5 of the bed 1 is fitted on the tip of the moving cylinder 12. This coupling piece 25 is clamped to the moving cylinder 12 by a caulked section 24 formed in the opening tip of the moving cylinder 12.

An installation hole 27 is formed in the tip of the coupling piece 25. The pivot 6 is inserted in the installation hole 27 to couple the moving cylinder 12 to the link 5.

As shown in FIG. 2 through FIG. 6, the end surface on the base end side of the housing 11 is in contact with a sub-housing 30. The outer diameter of the sub-housing 30 is the same size as the outer diameter of the housing 11 and is formed in a roughly square tubular shape that is open on the end opposite to the housing 11. That opening is covered by a sealing section 33 of a coupling piece 32 for connecting the housing 11 to the frame 2 of the bed 1. The sealing section 33 of the coupling piece 32 and the sub-housing 30 are tightened together by multiple screws 29 onto the housing 11.

A bracket 34 is provided protruding on the outer side end surface of the coupling piece 32. An installation hole 35 is formed in the bracket 34. Inserting the pivot 3 in this installation hole 35 joins the base end of the linear actuator 10 to the frame 2.

Figure 5A:
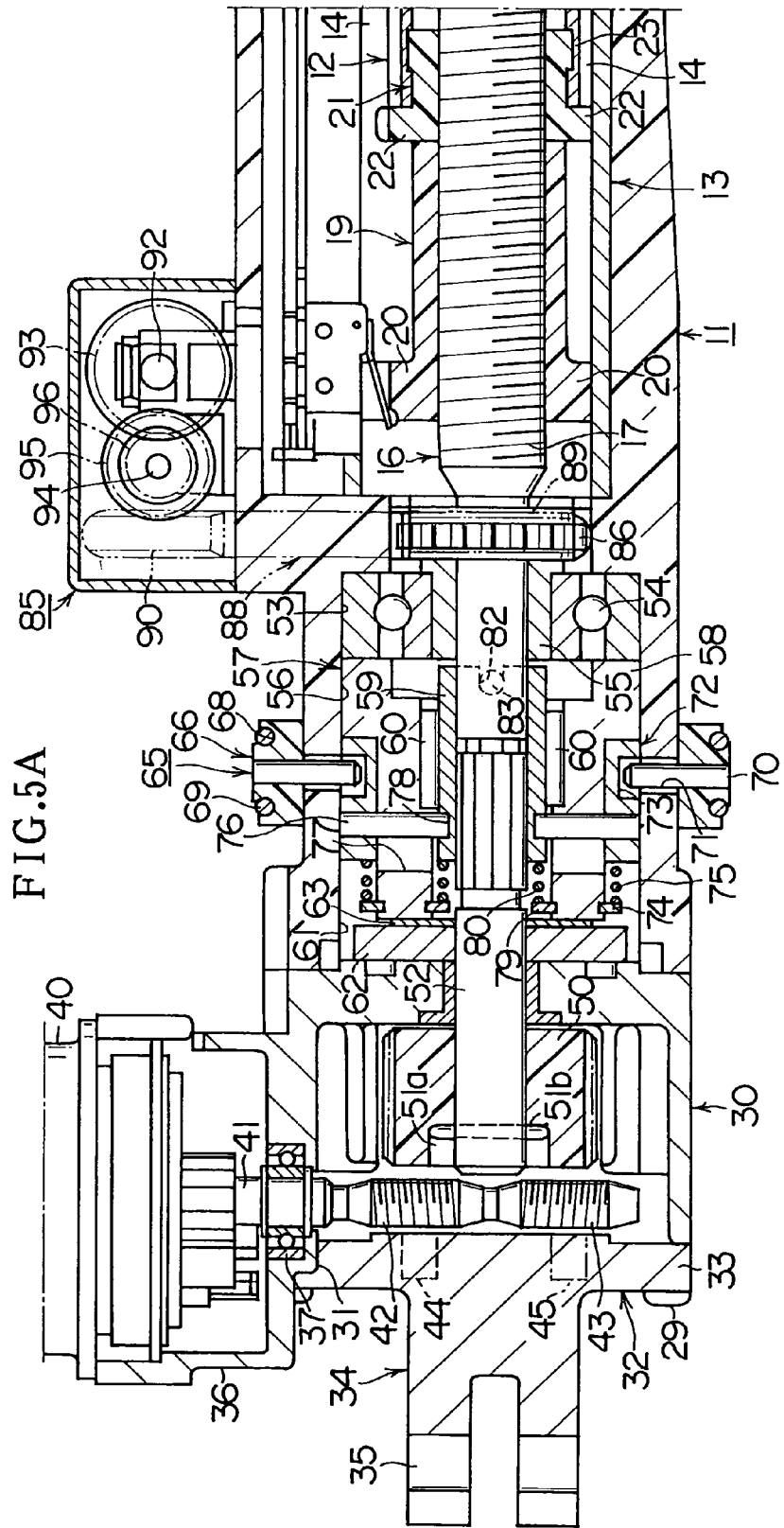
FIG. 5A is a plan cross sectional view showing the base end section.
Figure 6:
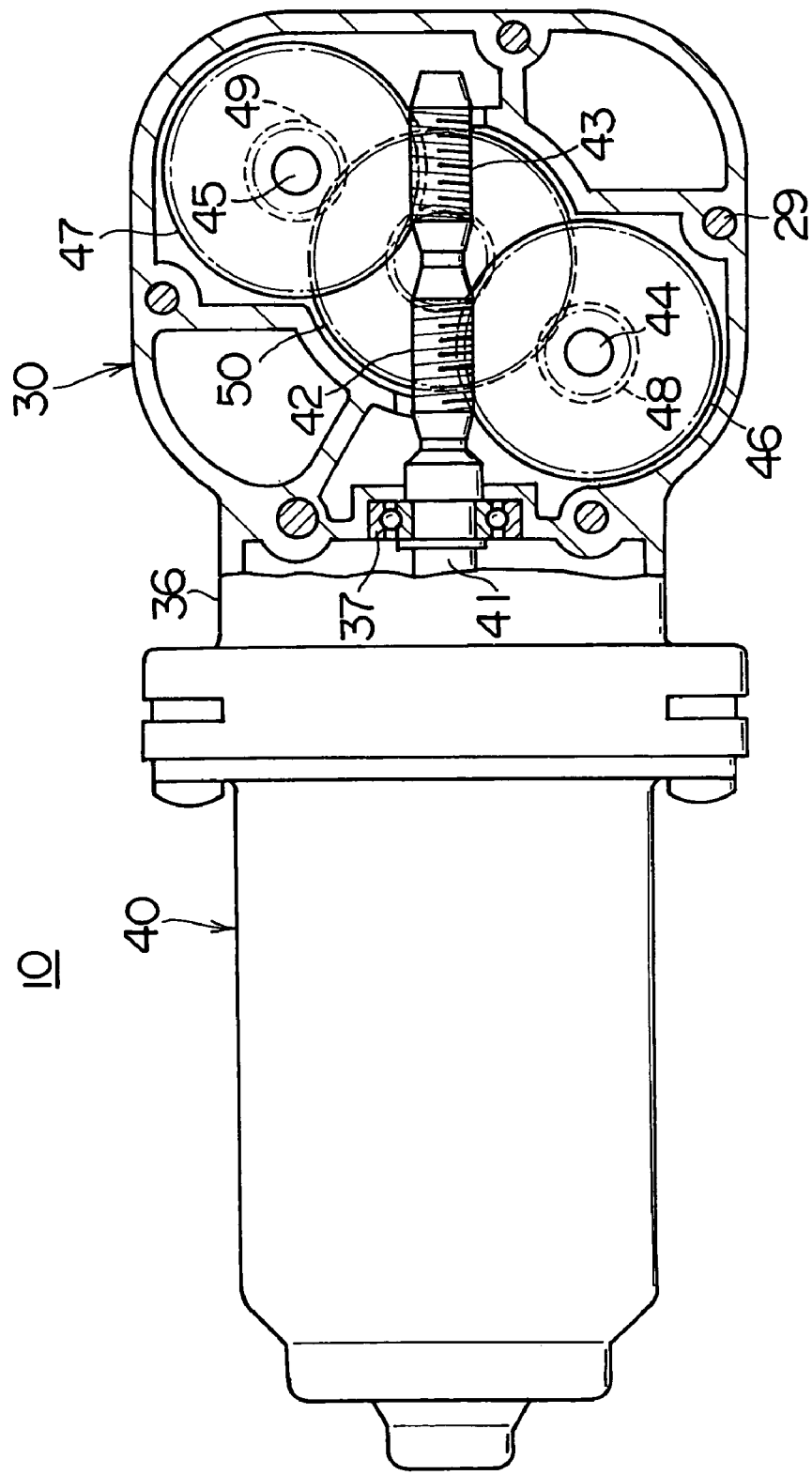
FIG. 6 is side cross sectional view taken along the line VI-VI of FIG. 4A.
Figure 7A:
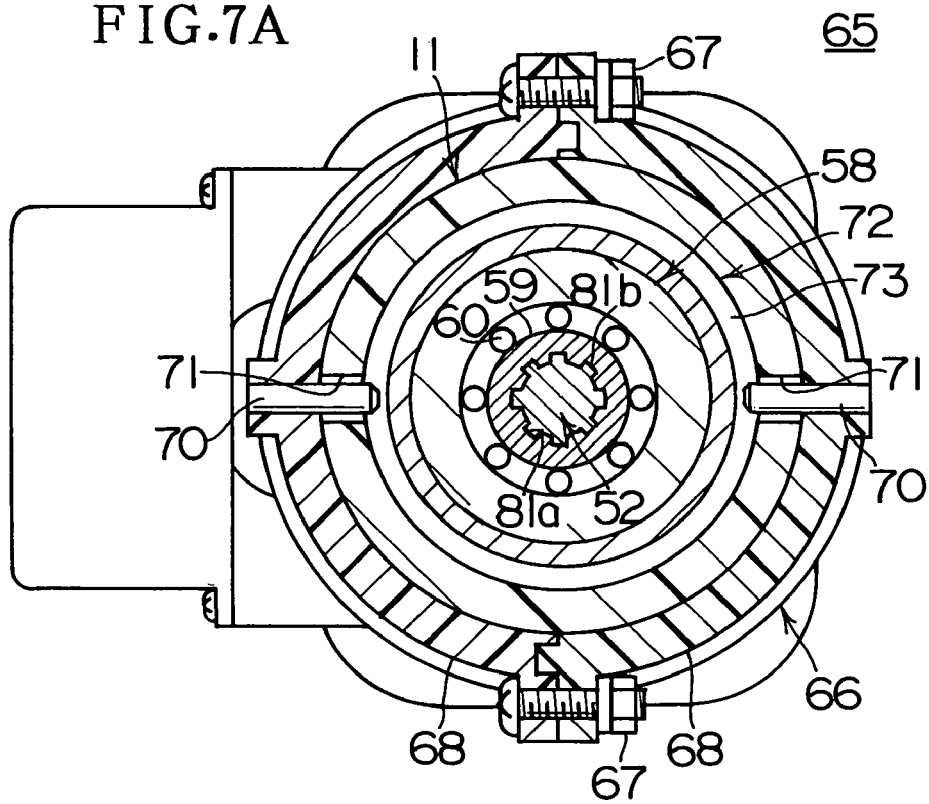
FIG. 7A is a side cross sectional view taken along the line VIIa-VIIa of FIG. 4A.
Figure 7B:
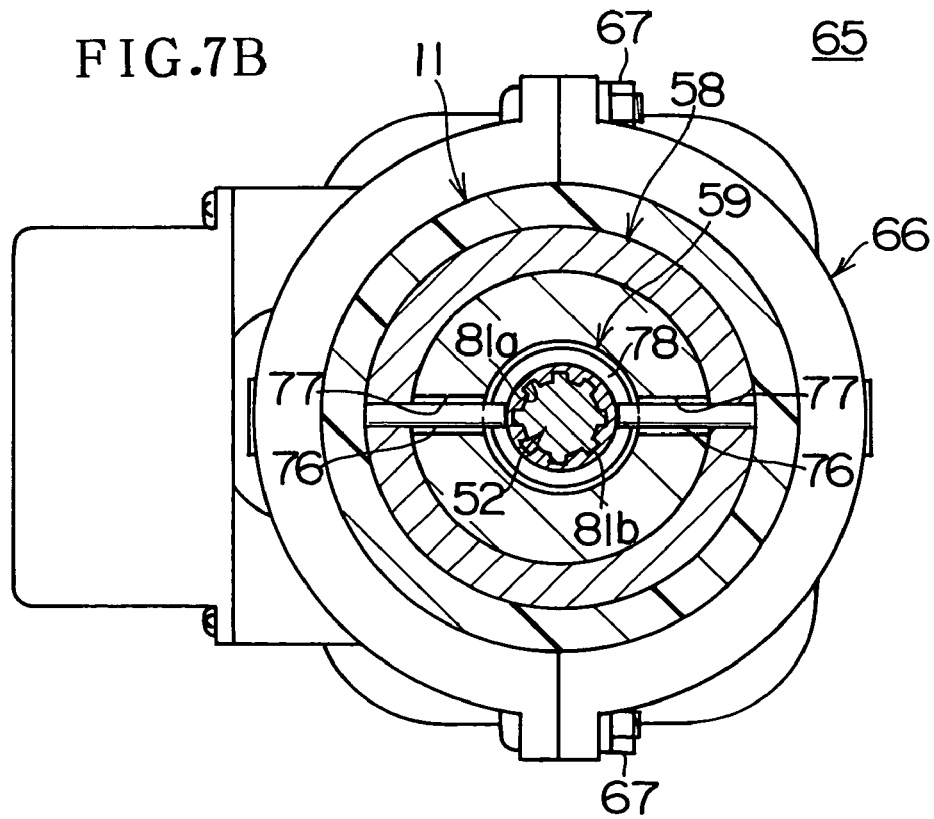
FIG. 7B is a side cross sectional view taken along the line VIIb-VIIb of FIG. 4A.

As shown in FIG. 3, FIG. 5A, and FIG. 6, a motor mount section 36 is formed to protrude at a position perpendicular to an opening 31 on the sub-housing 30. A motor 40 is installed in the motor mount section 36 and disposed so that a rotating shaft 41 intersects perpendicular to the center line of the sub-housing 30. One end of the rotating shaft 41 of the motor 40 is inserted into the interior of the sub-housing 30. The mid section of the rotating shaft 41 is supported to allow free rotation by a ball bearing 37 mounted in the motor mount section 36.

A pair of worms (hereinafter, sometimes called "the left-turn worm and the right-turn worm") 42, 43 possessing turn towards mutually opposite sides are respectively formed in an integrated piece on the outer circumference of a section inserted within the sub-housing 30 on the rotating shaft 41. A pair of support shafts 44, 45 are respectively installed parallel to the center line of the sub-housing 30 at positions on mutually opposite sides centering the rotating shaft 41 and positions respectively facing both the worms 42, 43 in the sub-housing 30.

A pair of worm wheels 46, 47 are respectively fitted on the support shafts 44, 45 and are supported to allow free rotation. Both the worm wheels 46, 47 respectively engage with the right-turn worm 42 and the left-turn worm 43.

Intermediate gears 48, 49 are each installed as an integrated piece on both the worm wheels 46, 47 with the centers aligned. Both these intermediate gears 48, 49 respectively engage with a drive gear 50.

As shown in FIG. 5A, the drive gear 50 is coupled by a slide key coupling on a sub-shaft 52 extending from the sub-housing 30 to the housing 11 to slide freely along the axis and to rotate as an integrated piece.

In other words, the sub-shaft 52 is supported to allow free rotation in the sub-housing 30 on a line extending along the shaft 16. The drive gear 50 is fitted on the outer circumference of one end of the sub-shaft 52 in the interior of the sub-housing 30. A key groove 51a is formed on one end surface of the drive gear 50, and a key 51b is provided on the sub-shaft 52. The key groove 51a and the key 51b are coupled as a slide key.

Coupling the drive gear 50 in this way with the sub-shaft 52 for rotating as an integrated piece and sliding freely along the axis of the sub-shaft 52 can prevent the load (force) applied axially (direction of thrust) to the sub-shaft 52 from being transmitted to the drive gear 50.

This drive gear 50 may also be formed as one piece integrated with the sub-shaft 52.

A bearing mount section 53 is formed in the section adjacent to the sub-housing 30 of the housing 11 as shown in FIG. 4A and FIG. 5A. A deep groove ball bearing 54 is mounted in the bearing mount section 53. The inner race of this deep groove ball bearing 54 is fitted by way of a collar 55 on the outer circumference of the base edge section of the shaft 16. The deep groove ball bearing 54 supports the base end of the shaft 16 to allow free rotation.

The deep groove ball bearing 54 is set to a large size allowing it to support not only the radial load of the shaft 16 but also the thrust load of the shaft 16. The bearing mount section 53 has a structure allowing sliding of the outer circumferential surface of the outer race of the deep groove ball bearing 54.

Utilizing a structure in this way, where the radial rolling bearing utilizes the deep groove ball bearing 54 set to a large size for supporting the shaft 16 for free rotation and set for sliding on the outer circumferential surface, allows eliminating a thrust bearing needed to bear the thrust load of the shaft 16.

A one-way clutch mount section 56 is formed consecutively with the bearing mount section 53 in a section adjacent to the bearing mount section 53 in the housing 11; and a one-way clutch 57 is installed in the one-way clutch mount section 56.

The one-way clutch 57 contains an outer race 58 and an inner race 59, and multiple rollers 60 disposed to allow free rolling between the outer race 58 and the inner race 59. The roller 60 bites in as a wedge shape between the inner circumferential surface of the outer race 58 and the outer circumferential surface of the inner race 59 to connect the outer race 58 with the shaft 16 during rotation of the shaft 16 in one direction.

The outer race 58 of the one-way clutch 57 makes contact only with the outer race of the deep groove ball bearing 54.

A brake plate mount section 61 is formed in the section adjacent to the sub-housing 30 in the housing 11. A base plate 62 is installed in this brake plate mount section 61.

The base plate 62 is formed in roughly a circular ring shape, and is fitted on the outer circumference of the sub-shaft 52. A pair of engaging portions provided so as to protrude on the end surface of the sub-housing 30 side on the base plate 62 engage with the engaging holes on the opposing surface of the sub-housing 30 so that the rotation of the base plate 62 is stopped.

A brake plate 63 is formed in roughly a circular ring shape with a diameter smaller than the base plate 62. The brake plate 63 is fitted on the outer race 58 of the one-way clutch 57 and the rotation is stopped. The mated surfaces of the brake plate 63 and the base plate 62 form a braking surface.

In this embodiment, a CPR mechanism 65 is installed between the shaft 16 and the sub-shaft 52 serving as an input shaft for conducting the rotation of the motor 40 to the shaft 16.

The CPR mechanism 65 is a clutch structure for engaging the shaft 16 and the sub-shaft 52 during normal use of the bed 1 and for disengaging the sub-shaft 52 and the shaft 16 in emergencies when performing cardiac-pulmonary resuscitation, etc.

As shown in FIG. 4A, FIG. 5A, FIG. 7A, FIG. 7B and FIG. 8, the CPR mechanism 65 contains an operating ring 66. The operating ring 66 is formed in a circular ring shape, and is fitted on the outer circumference of the housing 11. The operating ring 66 is split into two along the radial direction, and is fitted to slide freely along the periphery on the outer circumference of the housing 11 in a state where assembled in a circular ring shape by a set of two pairs of clamping jigs 67, 67.

A pair of ring grooves 68, 68 is mutually formed in parallel on the outer circumference of the operating ring 66. One ends of a pair of control wires 69, 69 are respectively wound and anchored on both the ring grooves 68, 68.

The other ends of the pair of control wires 69, 69 are respectively disposed on both the left and right sides of the bed 1, and are respectively anchored to the operating lever (not shown in drawing) installed on the left and right of the bed 1.

The other ends of the left/right control wires 69, 69 are therefore respectively pulled by the operating lever in an emergency, so the operating ring 66 can therefore fall the bed 1 to a flat position from either the left side or right side of the bed 1.

A pair of parallel pins 70, 70 are installed to respectively protrude inward along the radius, at positions separated mutually 180 degrees towards the periphery on the inner circumference of the operating ring 66. The pair of parallel pins 70, 70 are respectively inserted into cam holes 71, 71 formed at opposite positions in the housing 11.

Figure 8:
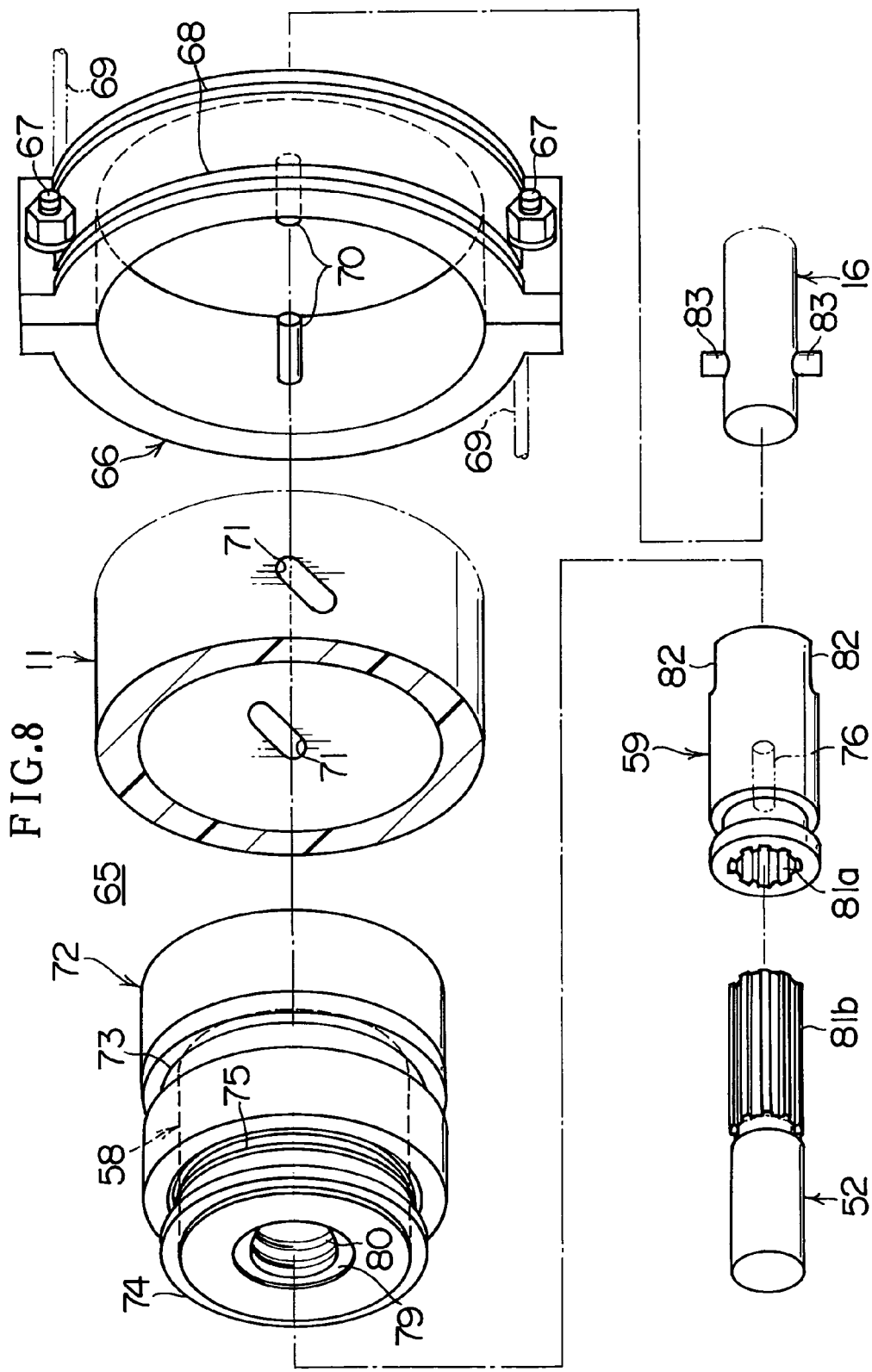
FIG. 8 is an exploded perspective view with a portion omitted showing the CPR mechanism.
Figure 9A:
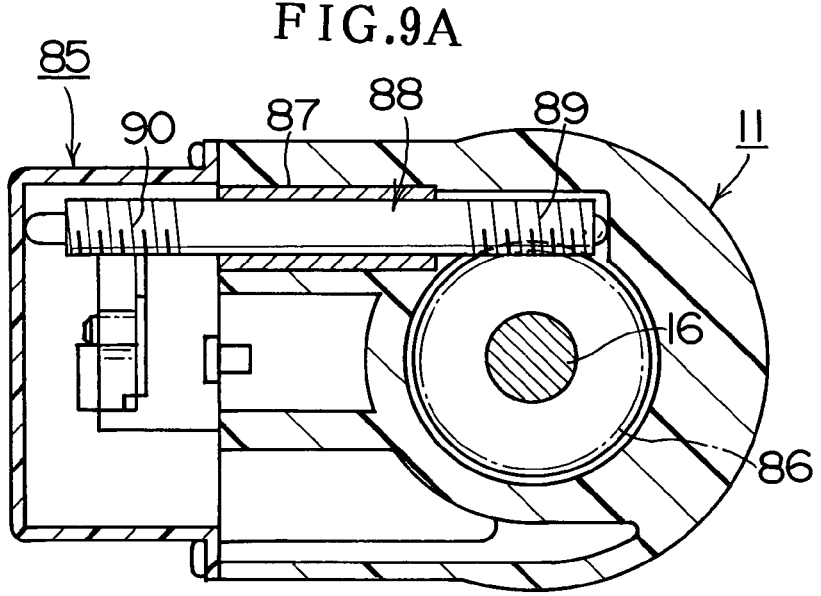
FIG. 9A is a side cross sectional view taken along the line IXa-IXa of FIG. 4A.
Figure 9B:
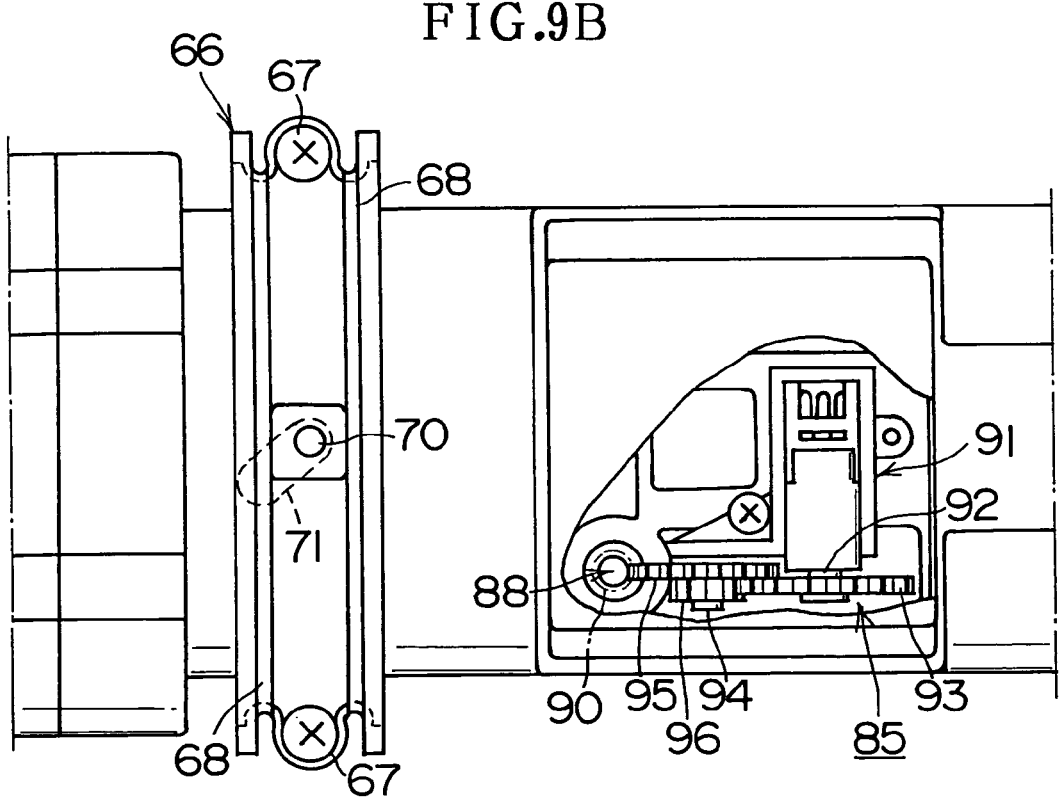
FIG. 9B is a partially cutaway view taken along the direction of the arrows substantially along the line IXb-IXb of FIG. 3.

As shown in FIG. 8, both the cam holes 71, 71 are inclined versus the surface perpendicular to the axial center of the housing 11. Both the parallel pins 70, 70 therefore move axially by the follow-up of the cam holes 71, 71 accompanying the slide towards the periphery of the operating ring 66.

A function ring 72 is installed in the one-way clutch mount section 56 in the housing 11. The function ring 72 is fitted to slide freely on the outer circumference of the outer race 58 of the one-way clutch 57. The function ring 72 converts the rotation of the operating ring 66 to an axial movement and transmits this movement to an inner race 59 also serving as a clutch sleeve for the CPR mechanism 65.

A ring groove 73 is formed on the outer circumferential surface of the function ring 72. The tips of the pair of parallel pins 70, 70 are respectively inserted through the cam hole 71 into this ring groove 73. The function ring 72 is shifted along the axis by the shifting of the parallel pin 70 along the axis accompanying the rotation of the operating rings 66.

A spring sheet 74 is fitted on the sub-housing 30 side end on the outer circumference of the outer race 58. A return spring 75 is installed in a compressed state between the end surface on the sub-housing 30 side of the function ring 72 and the spring sheet 74. This return spring 75 applies a constant force on the function ring 72 towards the side opposite the sub-housing 30.

A pair of engaging pins 76, 76 serving as engaging pins for clutch of the CPR mechanism 65 are respectively installed protruding inwards along the radius on the function ring 72 at a position that will not cause interference with the rollers 60 of the one-way clutch 57. Both the engaging pins 76, 76 are respectively inserted into pair of through holes 77, 77 formed on the outer race 58 so as not to interfere with the rollers 60.

A ring groove 78 is formed on the outer circumferential surface of the inner race 59 of the one-way clutch 57. The tips of the pair of engaging pins 76, 76 inserted in the through holes 77 are respectively inserted in the ring groove 78. The axial movement of the function ring 72 slaved to the operating ring 66 makes the inner race 59 move along the axis by way of the engaging pins 76, 76 and the ring groove 78.

A spring sheet 79 is fitted on the end of the sub-housing 30 side on the inner circumference of the outer race 58. A return spring 80 is installed in a compressed state between the end surface of the sub-housing 30 side of the inner race 59 and the spring sheet 79. The return spring 80 continually applies a force on the inner race 59 towards the side opposite the sub-housing 30.

The sub-shaft 52 and the shaft 16 are inserted from both ends in the inner circumference of the inner race 59. The sub-shaft 52 is coupled by a spline. Namely, a female spline 81a is formed on the inner circumference of the inner race 59; a male spline 81b is formed on the outer circumference of the sub-shaft 52; and the female spline 81a and the male spline 81b are fitted to freely slide along the axis. In other words, the inner race 59 is capable of sliding axial movement in a state where the rotation is stopped by the sub-shaft 52, and is able to slide freely along the axis and along the periphery of the shaft 16.

A pair of engaging notches 82, 82 are respectively formed at positions mutually separated 180 degrees on the end surface of the shaft 16 side of the inner race 59. Both the engaging notches 82, 82 are structured to engage with both ends of the fixed engaging pin 83 penetrating perpendicularly through the shaft 16.

In other words, both the engaging notches 82, 82 respectively fit and connect from the sub-shaft 52 side to both ends of the engaging pin 83, in a normal state where the inner race 59 is pressed back by the return spring 80, and when the inner race 59 has been shifted along the axis by the axial movement of the function ring 72 slaved to the operating ring 66; both the engaging notches 82, 82 release the engaging by separating towards the sub-shaft 52 side from both ends of the engaging pin 83.

The inner race 59 is in other words, functions as a clutch to engage and disengage the shaft 16 and the sub-shaft 52 serving as the input shaft.

In the CPR mechanism 65 structured as described above, when the bed is placed in a flat state for emergency cardiopulmonary resuscitation, either of the control wires 69 on the left or right of the bed 1 is pulled, the operating ring 66 is rotated so that the function ring 72 resists the force of the return spring 75 and is shifted towards the sub-housing 30, the movement of that function ring 72 moves the inner race 59 towards the sub-housing 30, and shifting of the inner race 59 disengages the link between the engaging pin 83 and both the engaging notches 82, 82 so that the connection between the sub-shaft 52 and the shaft 16, can be swiftly released.

Releasing the link with the sub-shaft 52, allows the shaft 16 to rotate freely so that the bed-back 4 of the bed 1 can be lowered in emergencies.

A potentiosensor mount section 85 is provided at the flank on the side opposite the one-way clutch mount section 56 of the deep groove ball bearing 54 in the housing 11 as shown in FIG. 4A, FIG. 5A, FIG. 9A and FIG. 9B. A worm wheel 86 is fitted on the outer circumference of the shaft 16 in the potentiosensor mount section 85 to rotate along with the shaft 16.

A worm shaft 88 in the potentiosensor mount section 85 inside the housing 11 is placed in a direction perpendicular to the axial direction of the shaft 16, and is supported to allow free rotation by a slide bearing 87.

A first worm 89 and a second worm 90 are respectively formed on both ends of the worm shaft 88. The first worm 89 engages with the worm wheel 86.

A potentiosensor 91 in the potentiosensor mount section 85 outside the housing 11 is installed in a direction where a sensor shaft 92 of the potentiosensor 91 is perpendicular to the shaft 16 and the worm shaft 88. A driven gear 93 is clamped to the sensor shaft 92 to rotate along with the sensor shaft 92.

A reduction gear shaft 94 is affixed in parallel and on one side of the potentiosensor 91 in the potentiosensor mount section 85. A large diameter reduction gear 95 and a small diameter reduction gear 96 are supported to allow mutual free rotation together on the reduction gear shaft 94. The driven gear 93 engages with the small diameter reduction gear 96, and the second worm 90 engages with the large reduction gear 95.

The rotation of the shaft 16 is therefore transmitted by way of the worm wheel 86, the first worm 89, the second worm 90, the large diameter reduction gear 95, the small diameter reduction gear 96, and the driven gear 93 to the sensor shaft 92.

The potentiosensor 91 converts the rotation of the sensor shaft 92 to a linear motion, and also converts to the size of the voltage.

The function and effect are described next.

The linear actuator 10 is pre-assembled into the bed 1 as shown in FIG. 1. In other words, by passing through the frame 2 of the bed 1, and by passing through the coupling piece 32 of the linear actuator 10, the pivot 3 connects the linear actuator 10 to the frame 2 of the bed 1 for free rotation. Moreover, the pivot 6 on the bed-back 4 side passes through the coupling piece 25 on the side of the moving cylinder 12 of the linear actuator 10 so that the pivot 6 connects the linear actuator 10 to the bed-back 4 for free rotation.

After the linear actuator 10 has been assembled into the bed 1, and the operator presses the operation button to the forward rotation side for raising the bed-back 4, the motor 40 rotates in the forward direction from the status shown in FIG. 1A, and the drive power of the rotating shaft 41 is transmitted by way of the pair of worms 42, 43, the worm wheels 46, 47, the intermediate gears 48, 49 and the drive gear 50 to the sub-shaft 52. The forward rotation of the sub-shaft 52 is transmitted to the shaft 16 by way of the engaging notch 82 of the inner race 59 and the engaging pin 83 of the shaft 16.

Only the shaft 16 rotates forward since the link between the one-way clutch 57 and the shaft 16 is released during forward rotation of this shaft 16. No braking force occurs at this time between the base plate 62 and the brake plate 63 fitted on the outer race 58 of the one-way clutch 57.

While the drive force of the rotating shaft 41 of the motor 40 is here being transmitted to the sub-shaft 52 or in other words the shaft 16, the torque from the rotating shaft 41 is divided into two portions by the pair of worm wheels 46, 47 so that the pair of worm wheels 46,47 can be made to a small outer diameter.

Making the worm wheels to a smaller outer diameter allows making the linear actuator 10 smaller.

A 10000N linear actuator design in the background art for example possesses an outer diameter 110 millimeters. However, the linear actuator of this embodiment can be made to a diameter of 90 millimeters.

Moreover, the method (Marshall method) for transmitting the drive force of the rotating shaft 41 of the motor 40 by way of the pair of worm wheels 46, 47 can allow making the linear actuator compact, and applies no thrust force to the rotating shaft 41 (armature shaft) of the motor 40 so that no friction occurs from the thrust force and higher drive efficiency and transmission efficiency is obtained.

When the motor 40 rotates the shaft 16 forward, the nut 19 advances along the support cylinder 13 so that the moving cylinder 12 linked to the nut 19 is pressed outward from the support cylinder 13. The nut 19 at this time slides along the anti-rotation means 14 of the support cylinder 13 made of plastic.

The anti-rotation mechanism prevents the moving cylinder 12 from rotating and the relative positions of the potentiosensor 91 and the moving cylinder 12 from deviating when the linear actuator 10 has not been installed on the bed 1. However, when the linear actuator 10 is installed in the bed 1, then the moving cylinder 12 is fixed to the bed 1 so that no anti-rotation mechanism is needed.

The forward movement of the moving cylinder 12 raises the bed-back 4 of the bed 1 linked to the coupling piece 25 of the moving cylinder 21 as shown in FIG. 1B.

The forward rotation of the shaft 16 on the other hand is transmitted to the sensor shaft 92 after being slowed by the first worm 89, second worm 90, large diameter reduction gear 95, small diameter reduction gear 96 and driven gear 93. The potentiosensor 91 converts the rotation speed of the sensor shaft 92 to a voltage value, and sends that voltage value to the controller (not shown in drawing) to control the operation of the bed 1.

The controller automatically stops the motor 40 when it detects a potential voltage matching the specified upper limit position.

The worm wheel 86 and the worm shaft 88 or in other words, the worm reduction gear is here utilized for transmitting the rotation of the shaft 16 to the sensor shaft 92 of the potentiosensor 91 so that the potentiosensor 91 can be installed at a position separate from the shaft 16, and a greater degree of freedom obtained for the potentiosensor 91 location.

Moreover, a large speed reducing ratio can be set by utilizing the worm reduction gear so that the large diameter reduction gear 95, small diameter reduction gear 96 and driven gear 93 need not be set to a large speed reducing ratio.

The second worm 90 on the worm shaft 88 may be substituted for the large diameter reduction gear 95 and the intermediate gears, etc.

When the motor 40 operation stops, the load (body weight of patient, etc.) on the bed-back 4 of the bed 1 is applied to the nut 19 and acts as a force making the nut 19 retreat by way of the moving cylinder 12 so that the load side reverse rotation force causing reverse rotation from the moving cylinder 12 or in other words, the load side, is applied to the shaft 16 by the action of the female screw 18 of the nut 19 and the male feed screw 17 of the shaft 16.

This load side reverse rotation force acts to link the shaft 16 with the outer race 58 so that the mating surfaces of the base plate 62 and the brake plate 63 fitted on the outer race 58 of the one-way clutch 57, act to form a braking surface that prevents reverse rotation of the shaft 16. The linear actuator 10 can therefore support the weight of the bed-back 4 while in a raised state.

When the operator 4 next pushes the operation button for reverse rotation to lower the bed-back 4, the motor 40 rotates in reverse, and the reverse rotation drive force of the rotation shaft 41 is transmitted by way of the pair of worms 42, 43, worm wheels 46, 47, intermediate gears 48, 49 and drive gear 50 to the sub-shaft 52. The reverse rotation of the sub-shaft 52 is transmitted to the shaft 16 by way of the engaging notch 82 of the inner race 59 and the engaging pin 83 of the shaft 16.

The nut 19 retreats along the support cylinder 13 when the motor 40 rotates the shaft 16 in reverse so that the moving cylinder 12 linked to the nut 19 is retreated in the support cylinder 13. The retreat of the moving cylinder 12 lowers the bed-back 4 of the bed 1 linked to the coupling piece 25 of the moving cylinder 12.

The outer race 58 and the inner race 59 of the one-way clutch 57 are linked at this time by the roller 60 by reverse rotation of the shaft 16 but the braking force between the brake plate 63 and the outer race 58 is set lower than the drive force on the shaft 16 of the motor 40 so that the one-way clutch 57 is idle relative to the housing 11 to allow the shaft 16 to rotate relative to the housing 11 in reverse.

In other words, the shaft 16 rotates in reverse relative to the housing 11 to make the nut 19 retreat along the support cylinder 13 so that the moving cylinder 12 linked to the nut 19 is pulled into the support cylinder 13 to lower the bed-back 4 of the bed 1 linked to the coupling piece 25 of the moving cylinder 12.

The reverse rotation of the shaft 16 on the other hand is transmitted to the sensor shaft 92 after being slowed by way of the first worm 89, second worm 90, large diameter reduction gear 95, small diameter reduction gear 96 and driven gear 93. The potentiosensor 91 converts the rotation speed of the sensor shaft 92 to a voltage value, and sends that voltage value to the controller (not shown in drawing) to control the operation of the bed 1.

The controller automatically stops the motor 40 when it detects a potential voltage matching the specified lower limit position.

When the motor 40 operation stops, the frame 2 of the bed 1 mechanically supports the load (body weight of patient, etc.) of the bed-back 4 so that there is no force acting to retreat the nut 19 on the moving cylinder 12, and therefore there is no load side reverse rotation force acting on the shaft 16.

The above described effect prevents the shaft 16 from rotating in reverse even if a load side reverse rotation force is constantly applied to the shaft 16 in a state where the bed-back 4 is lowered.

The operation of the CPR mechanism 65 in an emergency is described next while referring to FIGS. 10A and 10B.

Figure 10A:
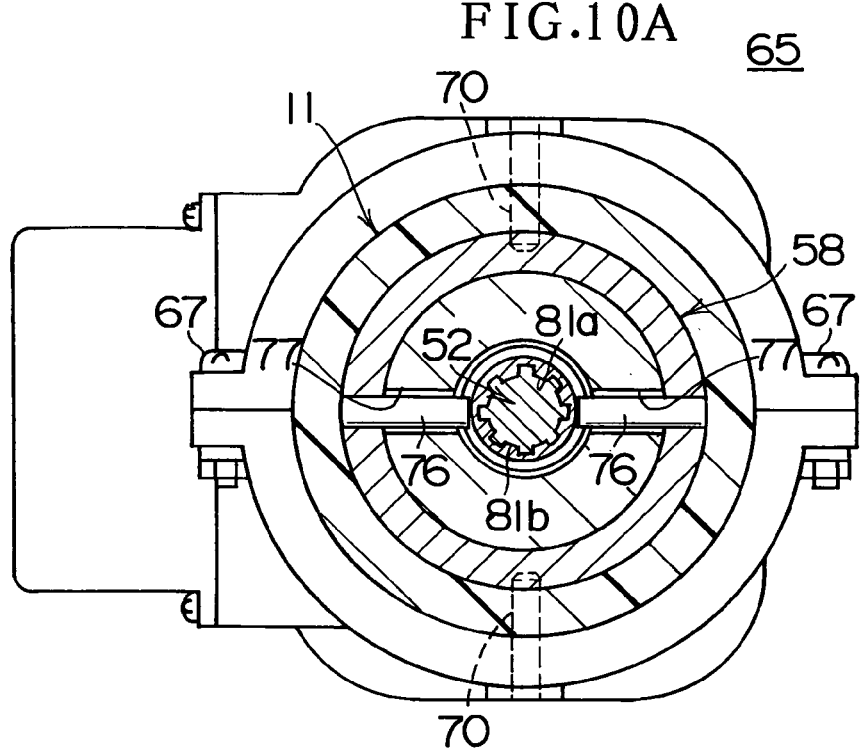
FIGS. 10A and 10B are drawings showing the CPR mechanism operation during emergencies.

When the bed-back 4 set to an erect position as shown in FIG. 1B, is swiftly positioned in a flat state in an emergency when performing cardiopulmonary resuscitation, etc., either of the control wires 69 on the left or right of the bed 1 is pulled by using the operating lever, then the operating ring 66 is rotated as shown in FIG. 10A.

Figure 10B:
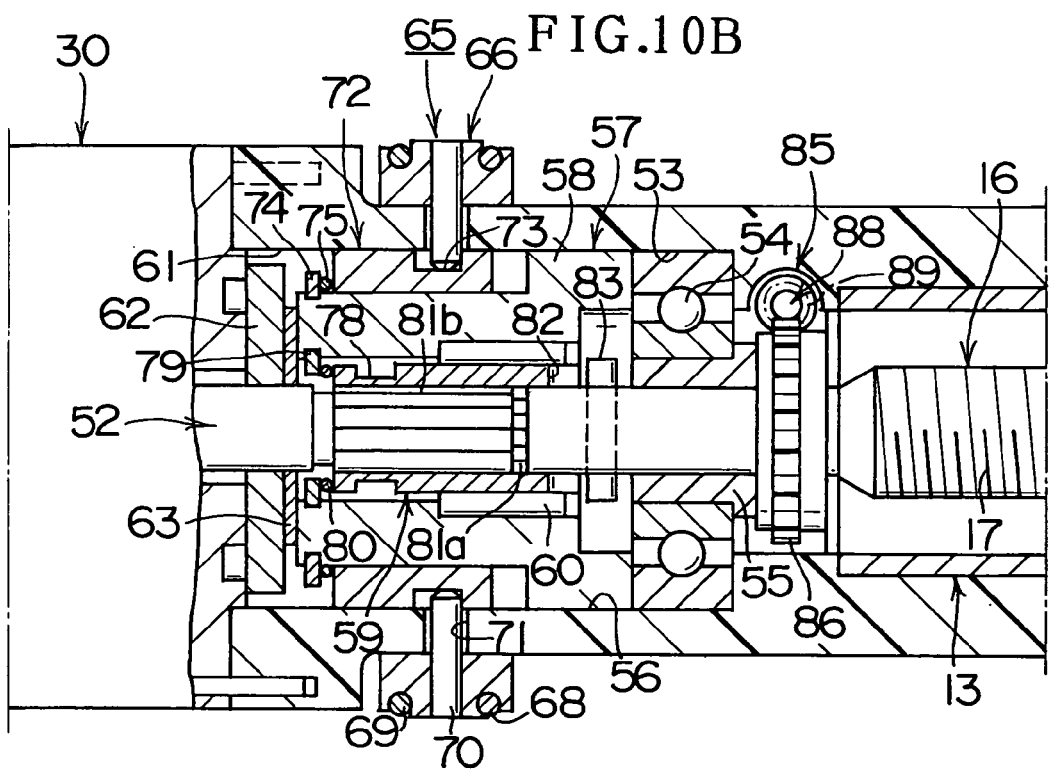

As shown in FIG. 10B, when the operating ring 66 is rotated, the function ring 72 resists the force of the return spring 75 and is shifted towards the sub-housing 30. Shifting the function ring 72 moves the inner race 59 towards the sub-housing 30. The shifting of the inner race 59 releases the engaging pin 83 from the engaging notches 82, 82 and the link between the sub-shaft 52 and the shaft 16 is released to disengage the link with the engaging pin 83.

Releasing the link between the shaft 16 and the sub-shaft 52, frees the shaft 16 rotation on the inner circumference of the inner race 59.

In this state, the weight (weight of the patient, etc.) of the bed-back 4 of the bed 1 is applied to the nut 19 and acts as a force making the nut 19 retreat by way of the moving cylinder 12 so that the load side reverse rotation force causing reverse rotation from the moving cylinder 12 or in other words, the load side, is applied to the shaft 16 by the action of the female screw 18 of the nut 19 and the male feed screw 17 of the shaft 16.

This load side reverse rotation force causes the shaft 16 to rotate in reverse on the inner circumference of the inner race 59 so that the bed-back 4 can fall due to its own weight.

This embodiment configured as described above renders the following effects.

(1) The correct operation of the linear actuator can be achieved since engaging the clutch during normal bed usage allows securely transmitting the drive power of the motor to the moving cylinder 12 because a clutch (CPR mechanism) that engages and disengages the shaft 16 and the sub-shaft 52 is installed between the shaft 16 screw-coupled with the nut 19 for advancing and retreating the moving cylinder 12 and the sub-shaft 52 that transmits the motor rotation. Therefore, the embodiment can be utilized in the usual bed.

(2) In emergencies such as at cardio-pulmonary resuscitation, the bed-back 4 of the bed 1 can be swiftly fallen by its own weight since the shaft 16 can swiftly shift to a free rotation state by disengaging the clutch (CPR mechanism).

(3) The bed can be prevented from unexpectedly becoming flat because the clutch is not easily disengaged even if an external force is applied to the operating lever or wire by mistake, since a structure is utilized where along with including the operating ring 66 fitted to rotate freely on the outer circumference of the housing 11, and the function ring 72 for converting the rotation of the operating ring 66 to an axial movement and transmitting it to the clutch (CPR mechanism), the function ring changes the rotation of the operating ring to a linear motion, and the clutch disengages the connection between the sub-shaft 52 and the shaft 16.

Operation is simple and reliable since the force of the operating lever can be transmitted without changing directions.

(4) There is more freedom in terms of space for installing the potentiosensor 91, because the potentiosensor 91 can be installed at a position separate from the shaft 16, since the worm reduction gear, or in other words the worm wheel 86 and the worm shaft 88 are utilized for transmitting the rotation of the shaft 16 to the sensor shaft 92 of the potentiosensor 91.

(5) The space needed for installing the potentiosensor can be kept small as in (4) above, since a large speed reducing ratio can be set by utilizing the worm reduction gear for transmitting the rotation of the shaft 16 to the sensor shaft 92 of the potentisensor 91 so that there is no need to set the large diameter reduction gear 95, the small diameter reduction gear 96 and the driven gear 93 to a large speed reducing ratio. Therefore, the linear actuator can be made compact.

(6) Besides being able to incorporate the CPR mechanism into the linear actuator used in the sick bed/nursing bed, the accuracy of the potentiosensor can also be maintained, since deviations can be prevented from occurring between the relative positions of the moving cylinder 12 and the sensor shaft 92 of the potentiosensor 91, even if the link between the shaft 16 and the rotation shaft 41 of the motor 40 is released in emergency operation of the CPR mechanism, by the worm reduction gear linking the sensor shaft 92 of the potentiosensor 91 with the shaft 16.

(7) The motor stator section can be prevented from flying outwards relative to the axial center of the linear actuator since the worm shaft and worm wheel can be positioned symmetrically by utilizing a structure where a pair of worm wheels engage with the worm shaft of the worm reduction gear for reducing and transmitting the motor rotation to the shaft, and the rotation of both the worm wheels is transmitted to the shaft.

(8) There is a high degree of freedom for designing the bed because preventing the motor stator section from flying outwards relative to the axial center of the linear actuator allows eliminating dimensional restrictions and limits on the installation direction when installing this linear actuator onto the bed.

(9) The outer diameter of the pair of worm wheels can be made smaller since the torque of the motor rotation shaft is apportioned into the pair of worm wheels by a structure where the pair of worm wheels engage with the worm shaft of the worm reduction gear for reducing and transmitting the motor rotation to the shaft, and the rotation of both the worm wheels is transmitted to the shaft.

(10) The linear actuator is advantageous for designing the bed since the linear actuator can be made compact and lightweight by setting the worm wheel to a small outer diameter.

Figure 11:
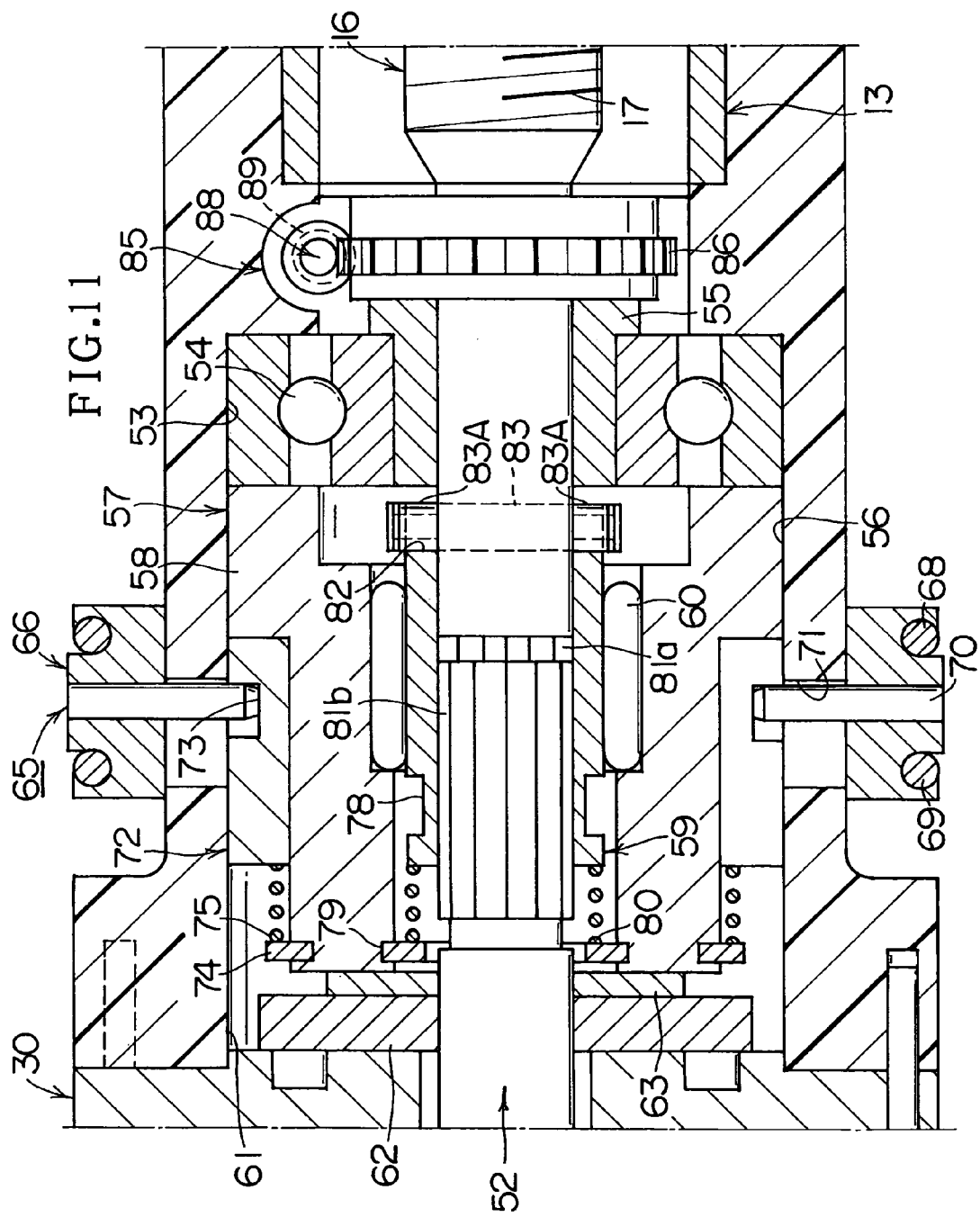
FIG. 11 is a frontal cross sectional view showing the normal operation of the CPR mechanism in the linear actuator as the second embodiment of the present invention.

FIG. 11 is a frontal cross sectional view showing the normal operation of the CPR mechanism in the linear actuator as the second embodiment of the present invention.

Figure 12A:
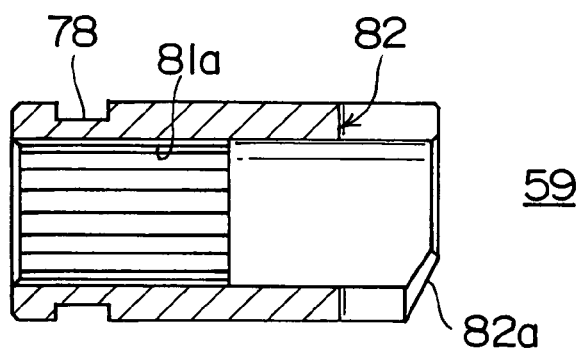
FIG. 12A is a frontal cross sectional view showing the inner race.
Figure 12B:
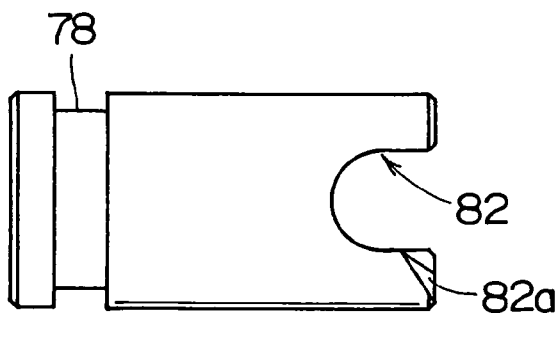
FIG. 12B is a plan view showing the inner race.
Figure 12C:
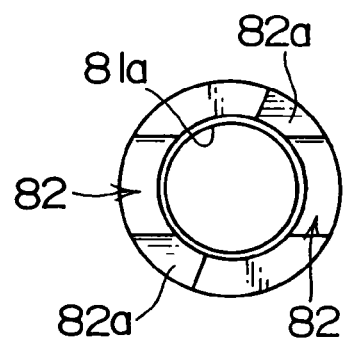
FIG. 12C is a right side view of the inner race.

FIG. 12A is a frontal cross sectional view showing the inner race. FIG. 12B is a plan cross sectional view showing the inner race; FIG. 12C is a right side view showing the inner race.

Figure 13A:
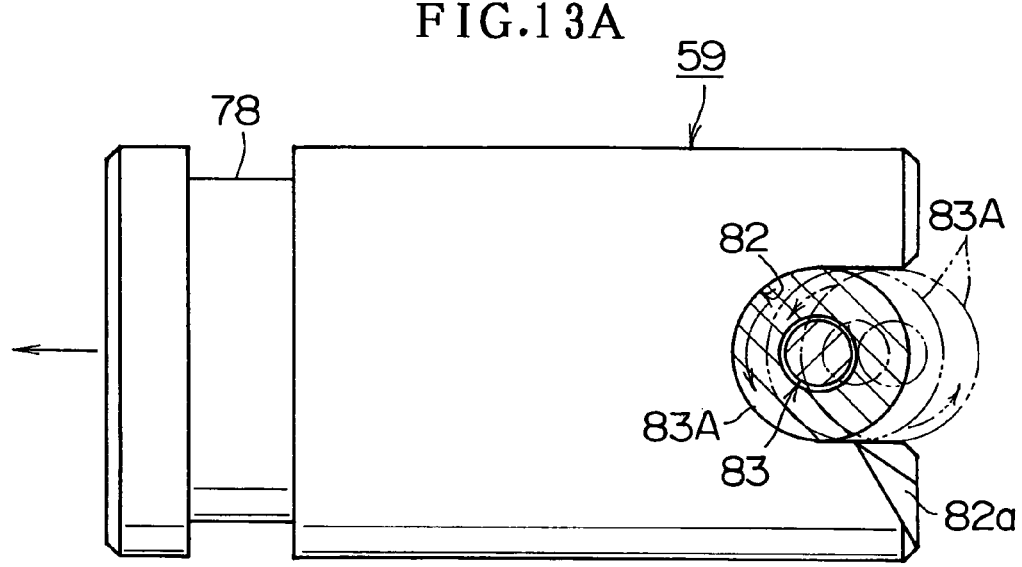
FIGS. 13A and 13B are schematic views showing the relation between the engaging pin and the engaging notch.
Figure 13B:
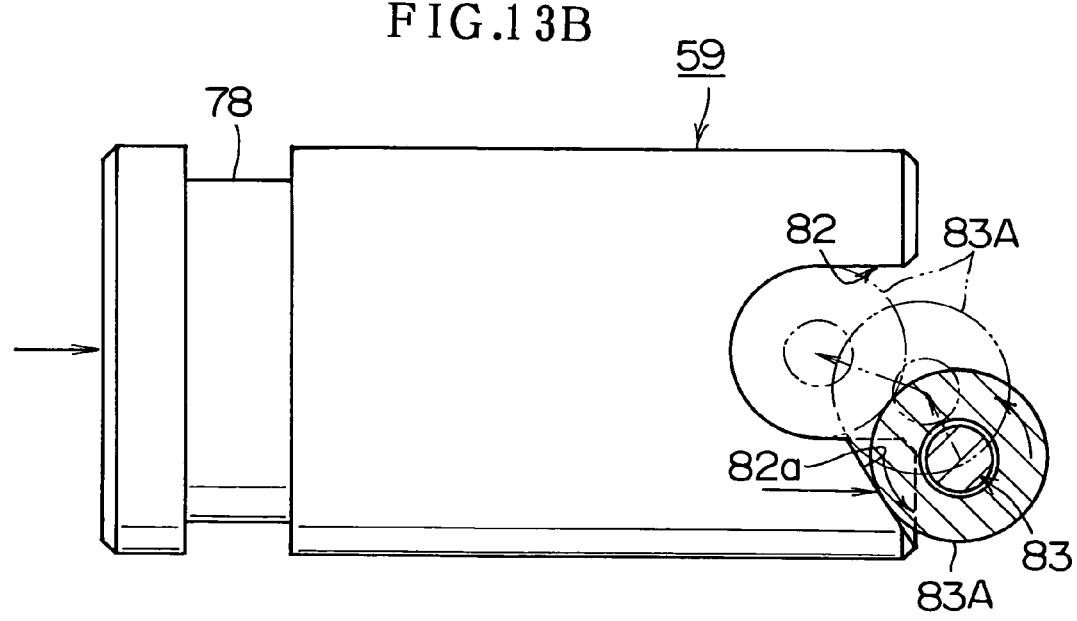

FIGS. 13A and 13B are drawings showing schematic views of relation of the engaging pin to the engaging notch. FIG. 13A shows the disengaging operation of the engaging pin and engaging notch. FIG. 13B shows the engaging operation of the engaging pin and engaging notch.

A CPR mechanism 65A of the present embodiment differs from the CPR mechanism 65 of the first embodiment in the point that pair of cylindrical rollers 83A, 83A are respectively fitted to allow free rotation on both ends of the engaging pin 83; the point that a guide angle section 82a (See FIGS. 12A, 12B and 12C) is formed on the edge becoming the front side towards the forward rotation (rotation direction for raising the bed-back 4) during engaging among a pair of edges on the opening of the engaging notch 82 of the inner race 59 serving as the sleeve for the clutch of the CPR mechanism 65A.

The function and effect of the CPR mechanism 65A of this embodiment are described next.

During normal raising and lowering of the bed-back 4, the return spring 80 pushes back the inner race 59 serving as the sleeve for the clutch of the CPR mechanism 65A toward the shaft 16 so that as shown in FIG. 11, the pair of rollers 83A, 83A fitted on both ends of the engaging pin 83 for the clutch of the CPR mechanism 65A are in a state where inserted relatively into both the engaging notches 82, 82 of the inner race 59.

At this time, the guide angle 82a is formed on the edge becoming front side in the forward rotation direction among the pair of opening edges of the engaging notch 82 so that a large motive force can be reliably transmitted during raising of the bed-back 4.

When the bed-back 4 is swiftly placed in a flat state from a raised state as shown in FIG. 1B in an emergency when performing cardiopulmonary resuscitation, etc., either of the control wires 69 on the left or right of the bed 1 is pulled by using the operating lever, then the operating ring 66 is rotated. When the operating ring 66 is rotated, the function ring 72 resists the force of the return spring 75 and is shifted towards the sub-housing 30, and the movement of this function ring 72 shifts the inner race 59 towards the sub-housing 30 (See FIGS. 10A and 10B).

The inner race 59 movement towards the sub-housing 30 releases the engaging pin 83 from the engaging notch 82 as shown in FIG. 13A.

In this state where the engaging pin 83 has released from the engaging notch 82, the load (body weight of patient, etc.) on the bed-back 4 of the bed 1 is applied to the nut 19 and acts as a force making the nut 19 retreat by way of the moving cylinder 12, so that the load side reverse rotation force causing reverse rotation from the moving cylinder 12 or in other words, the load side, is applied to the shaft 16 by the action of the female screw 18 of the nut 19 and the male feed screw 17 of the shaft 16.

The effect of this load side reverse rotation force makes the shaft 16 rotate in reverse on the inner circumference of the inner race 59 so that the bed-back 4 lowers from its own weight.

As shown in FIG. 13A, during release of the engaging pin 83 from the engaging notch 82, the roller 83A is fitted on the engaging pin 83 to allow free rotation that is converted into roll friction resistance so that the friction can be reduced when the engaging pin 83 disengages from the engaging notch 82.

The operating force applied to the operating lever of the control wire 69 when setting the bed-back 4 to a flat state can consequently be reduced relatively.

The bed-back 4 can consequently be set to a flat state regardless of the amount of operating force, by operating the operating lever as need in emergencies such as cardio-pulmonary resuscitation.

When the operating force on the operating lever for the control wire 69 is released after setting the bed-back 4 to a flat state in an emergency when performing cardio-pulmonary resuscitation, etc., the return spring 80 presses the inner race 59 back toward the shaft 16 so that the pair of rollers 83A, 83A fitted on both ends of the engaging pin 83 as shown in FIG. 13B, are consequently inserted into both the engaging notches 82, 82.

A guide angle section 82a is formed on the opening edge of the engaging notch 82 so that the roller 83A can fit securely into the engaging notch 82.

The roller 83A is fitted on the engaging pin 83 to rotate freely and so rolls securely on the guide angle section 82a and fits into the engaging notch 82.

Therefore, the CPR mechanism 65A can be automatically and securely restored to the normal operating state for raising and lowering the bed-back 4 by releasing the operating force on the operating lever in emergencies such as cardio-pulmonary resuscitation.

Figure 14A:
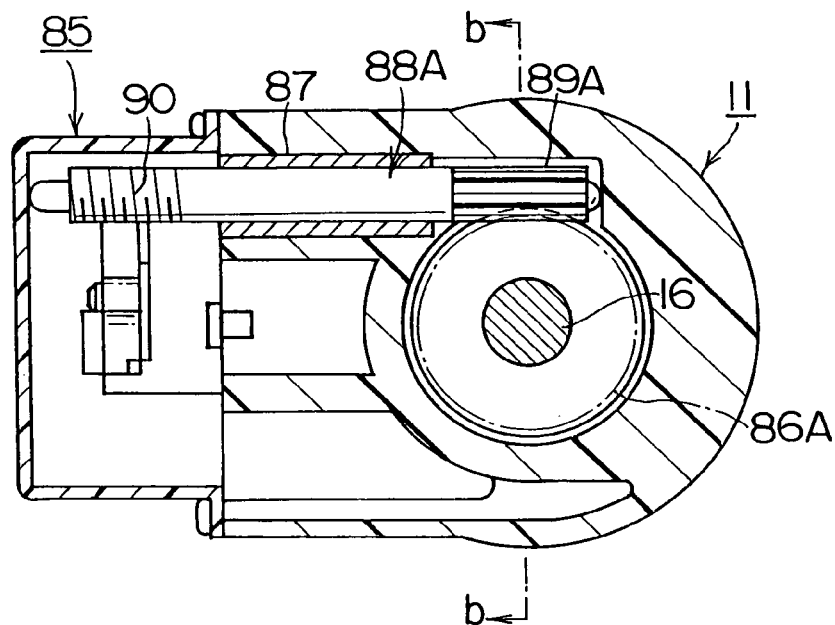
FIGS. 14A and 14B are drawings showing the potentiosensor mount section in the linear actuator as the third embodiment of the present invention.
Figure 14B:
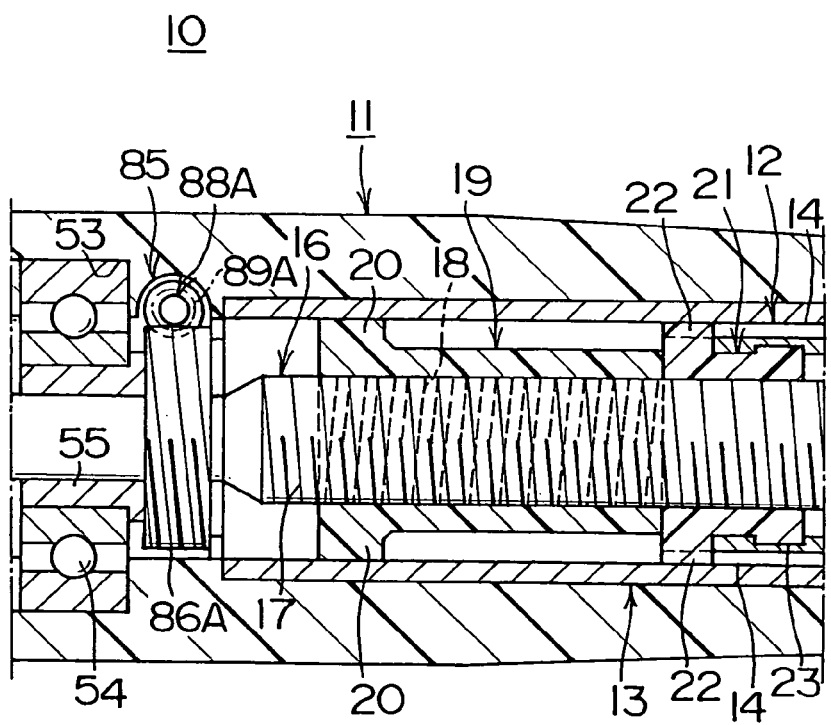

FIGS. 14A and 14B are drawings showing the potentiosensor mount section in the linear actuator as the third embodiment of the present invention.

The present embodiment differs from the first embodiment in the point that along with installing a first worm 86a in the shaft 16, a worm wheel shaft 88a for a worm wheel 89a engaging with the first worm 86a is installed in the potentiosensor mount section 85; and further differs in the point that the worm wheel shaft 88a is connected to the sensor shaft 92 of the potentiosensor 91.

In the present embodiment, the sensor shaft 92 of the potentiosensor 91 is connected to the shaft 16 by way of the worm reduction gear so that the same functions and effect as the first embodiment can be obtained.

The second worm 90 of the worm shaft 88 may be substituted for the large diameter reduction gear 95 and intermediate gears, etc.

FIGS. 15A and 15B are drawings showing the free wheel mechanism in the linear actuator as the fourth embodiment of the present invention. FIG. 15A is a frontal partially cross sectional view with a portion omitted showing the state during full stroke. FIG. 15B is a frontal partially cross sectional view with a portion omitted showing the separation of the nut from the moving cylinder.

In the present embodiment, the moving cylinder 12 is formed in a round pipe shape longer than the support cylinder 13. The tip of the moving cylinder 12 protrudes from the plug 15 fitted on the support cylinder 13. The intermediate section of the moving cylinder 12 is in a state where supported to allow free sliding movement on the plug 15.

A small diameter lap section 21c with an outer diameter smaller than the inner diameter of the moving cylinder 12 is formed on the tip of the nut 19. The lap section 21c is inserted into the base end section of the moving cylinder 12 to allow free insertion and extraction.

The end surface of the base end side of the moving cylinder 12 is structured to abut against a corner section formed by the lap section 21c of the nut 19. In other words, the moving cylinder 12 basically follows the advance and retreat of the nut 19.

A guide 22C formed in a circular ring shape with an outer diameter approximately the same as the inner diameter of the moving cylinder 12, is installed on the edge at the tip inside the moving cylinder 12 and its position is limited by a stopper 23C. In other words, a ring groove 22D is formed on the outer circumferential surface of the guide 22C. The tip of the pin-shaped stopper 23C passing through the moving cylinder 12 along the radius is inserted into the ring groove 22D to link the groove.

The end surface of the base end side of the guide 22C adjoins the tip surface of the nut 19 inserted into the base end of the moving cylinder 12 but does not make contact, and does not apply a load on the guide 22C. Moreover, the inner diameter of the guide 22C is set to a diameter slightly larger than the outer diameter of the shaft 16, and the guide 22C is set so as not to interfere with the rotation of the shaft 16.

The effect and function of the so-called free wheel mechanism for preventing the return thrust of the motor 40 from being applied to pinched items, by the moving cylinder 12 automatically separating from the nut 19, when hands or objects have been pinched during lowering of the bed-back 4 of the bed 1 is described next while referring to FIGS. 15A and 15B.

First of all, FIG. 15A shows the full stroke state where the nut 19 moved to the tip of the shaft 16.

In this full stroke state, the lap clearance between the moving cylinder 12 and the support cylinder 13 serving essentially as a portion of the housing 11, is a length L in FIG. 15A defined by the overlapping clearance between the base end of the moving cylinder 12 and the lap section 21C of the nut 19 and so can possess adequate dimensions.

Therefore, even at a full stroke where the nut 19 is moved to the tip edge of the shaft 16, the lap clearance L between the moving cylinder 12 and the support cylinder 13 serving essentially as a portion of the housing 11, can maintain sufficient strength versus the pressing load. The linear actuator 10 can therefore raise the bed-back 4 of the bed 1 using a full stroke.

In other words, the overall length of the linear actuator 10 can be shortened.

For example, when the operator presses the operation button on the reverse rotation side for lowering the bed-back 4 from a state where the bed-back 4 had been raised using a full stroke, and the motor 40 is operated to rotate in the reverse direction, then the nut 19 is retreated by the reverse rotation of the shaft 16 as described previously.

When the bed-back 4 of the bed 1 is kept due to some reason and cannot lower, only the nut 19 retreats along with the reverse rotation of the shaft 16 so that as shown in FIG. 15B, the lap section 21C of the nut 19 is moved apart from the base end of the moving cylinder 12, and the nut 19 separates from the moving cylinder 12.

Therefore, no return thrust from the motor 40 is applied to the moving cylinder 12.

In the case that the nut 19 resists the hung up state of the bed-back 4 and pulls the moving cylinder 12, the excess load is applied to the motor 40. In the present embodiment, however, only the nut 19 retreats along with the reverse rotation of the shaft 16 so that no excess load is applied to the motor 40.

In other words, the safety of the bed 1 and the linear actuator 10 is improved.

Further, the sufficient strength can be obtained even when the nut 19 has been moved apart from the base end of the moving cylinder 12, because as shown in FIG. 15B, the base end of the moving cylinder 12 is supported in the support cylinder 13 in a state where enclosing the guide 22C.

Also, while in a state where the nut 19 has been moved apart from the base end of the moving cylinder 12, the guide 22C keeps the moving cylinder 12 and the shaft 16 in a concentric state so that the lap section 21C of the nut 19 can securely advance into the base end of the moving cylinder 12 when the state in FIG. 15B returns to the state in FIG. 15A.

The fourth embodiment can render the following effects.

(1) The nut 19 can be automatically moved apart from the moving cylinder 12 in cases where for example, hands or other objects are pinched during lowering of the bed-back 4 of the bed 1, by inserting the base end of the moving cylinder 12 into the lap section 21C of the nut 19 to allow moving forward and reverse.

(2) The safety of the sick bed/nursing bed and the linear actuator can be improved since separating the nut 19 automatically from the moving cylinder 12 prevents a large mechanical force from being applied to the pinched objects, and also prevents an excessive load from being applied to the motor 40.

(3) Sufficient strength can be maintained versus the pressing load, and making the moving cylinder 1 longer can be avoided since inserting the base end of the moving cylinder 12 into the lap section 21C of the nut 19 to advance and retreat allows to obtain a sufficient lap clearance L between the nut 19 and the moving cylinder 12.

(4) The lap section 21C of the nut 19 can be securely inserted into the base end of the moving cylinder 12 during return of the nut 19 to the base end of the moving cylinder 12, and sufficient strength can be maintained even when the nut 19 has moved apart from the base end of the moving cylinder 12, since the base end section of the moving cylinder 12 is supported in the support cylinder 13 in a state where enclosing the guide 22C, while the linear actuator is at full stroke because the base end of the moving cylinder 12 is inserted into the lap section 21C of the nut 19 to advance and retreat, the guide 22C is positioned adjacent to the insertion edge of the nut 19 in the interior of the moving cylinder 12, and the position of the guide 22C is restricted by the stopper 23C in the moving cylinder 12.

The present invention is not limited by the above embodiments, and needless to say various adaptations and modifications not departing from the spirit and scope of the present invention are allowed.

The above embodiments described raising and lowering the back section of the bed, however, the linear actuator of this invention may be structured to raise and lower the bed.

If structured to raise and lower the bed, then the invention can perform the function of swiftly lowering the bed in emergencies.

The above embodiments described a linear actuator for nursing or medical treatment sick beds, however, the actuator of this invention is not limited to those beds and may be applied to applications such as electrical automotive products.

The invention claimed is:

1. A linear actuator comprising a housing supporting a shaft with a male screw to allow free rotation, a female screw member that is coupled by a screw to the male screw and advances or retreats by the forward rotation of the shaft and advances or retreats by the reverse rotation of the shaft, a moving cylinder that is fixed to the female screw member and advances and retreats relative to the housing, an input shaft for transmitting the rotation of a motor to the shaft, a clutch for engaging and disengaging the input shaft and the shaft, an operating ring fitted to allow free rotation on an outer circumference of the housing, and a function ring to convert the rotation of the operating ring to an axial movement and transmit the axial movement to the clutch.

2. A linear actuator according to claim 1, wherein the clutch includes a sleeve fitted to slide freely on the input shaft, and an engaging pin fixed to the shaft, and an engaging notch is provided on the end of the engaging pin side of the sleeve to engage and disengage with the engaging pin by the sliding of the sleeve.

3. A linear actuator according to claim 2, wherein a roller is fitted to allow free rotation in the engaging pin.

4. A linear actuator according to claim 2, wherein a guide angle section for receiving the engaging pin is formed in the engaging notch.

5. A linear actuator according to claim 3, wherein a guide angle section for receiving the engaging pin is formed in the engaging notch.

6. A linear actuator according to claim 1, wherein the linear actuator includes a worm wheel fixed to the shaft, and a worm shaft with a worm engaging with the worm wheel, and the worm shaft is connected to a sensor shaft of a potentiometer to detect a position of the moving cylinder.

7. A linear actuator according to claim 1, wherein the linear actuator includes a worm installed on the shaft, a worm wheel engaging with the worm, and a worm wheel shaft installed on the worm wheel, and the worm wheel shaft is connected to a sensor shaft of a potentiometer to detect a position of the moving cylinder.

8. A linear actuator according to claim 1, wherein a worm reduction gear reduces and transmits the rotation of a motor to the shaft, a pair of worm wheels engage with a worm shaft of the worm reduction gear, and the rotation of both the worm wheels is transmitted to the shaft.

9. A linear actuator according to claim 8, wherein the axial center of the shaft is positioned perpendicular to the worm shaft.

10. A linear actuator according to claim 8, wherein the motor is installed at the flank of the shaft end.

11. A linear actuator according to claim 1, wherein a lap section is formed on the female screw member, one end of the moving cylinder is inserted into the lap section.

12. A linear actuator according to claim 11, wherein along with positioning a guide adjacent to an insertion end surface of the female screw member inside the moving cylinder; the position of the guide is restricted in the moving cylinder.

* * * * *